United States Patent
O'Shea et al.

(10) Patent No.: US 11,233,561 B1
(45) Date of Patent: *Jan. 25, 2022

(54) LEARNING-BASED SPACE COMMUNICATIONS SYSTEMS

(71) Applicant: DeepSig Inc., Arlington, VA (US)

(72) Inventors: Timothy James O'Shea, Arlington, VA (US); James Shea, Arlington, VA (US); Ben Hilburn, Arlington, VA (US)

(73) Assignee: DeepSig Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/994,741

(22) Filed: Aug. 17, 2020

Related U.S. Application Data

(63) Continuation of application No. 15/999,025, filed on Aug. 20, 2018, now Pat. No. 10,749,594.

(60) Provisional application No. 62/547,239, filed on Aug. 18, 2017.

(51) Int. Cl.
| | | |
|---|---|---|
| *H04B 17/345* | (2015.01) | |
| *H04B 7/185* | (2006.01) | |
| *G06N 20/00* | (2019.01) | |
| *H04B 17/336* | (2015.01) | |
| *H04B 17/318* | (2015.01) | |

(52) U.S. Cl.
CPC ......... *H04B 7/18513* (2013.01); *G06N 20/00* (2019.01); *H04B 7/18521* (2013.01); *H04B 7/18523* (2013.01); *H04B 17/318* (2015.01); *H04B 17/336* (2015.01); *H04B 17/345* (2015.01)

(58) Field of Classification Search
CPC ............ H04B 7/18513; H04B 7/18521; H04B 7/18523; H04B 17/318; H04B 17/336; H04B 17/345; G06N 20/00
USPC .......................................... 706/12; 455/13.1
See application file for complete search history.

(56) References Cited

U.S. PATENT DOCUMENTS

| | | | |
|---|---|---|---|
| 5,722,042 A | 2/1998 | Karasawa et al. | |
| 6,339,707 B1 * | 1/2002 | Wainfan | H04B 7/195 455/427 |
| 6,708,029 B2 * | 3/2004 | Wesel | H04B 7/18578 370/307 |

(Continued)

*Primary Examiner* — Hai V Nguyen
(74) *Attorney, Agent, or Firm* — Fish & Richardson P.C.

(57) ABSTRACT

Methods and systems including computer programs encoded on computer storage media, for training and deploying machine-learned communication over RF channels. One of the methods includes: determining first information; generating a first RF signal by processing the first information using an encoder machine-learning network of the first transceiver; transmitting the first RF signal from the first transceiver to a communications satellite or ground station through a first communication channel; receiving, from the communications satellite or ground station through a second communication channel, a second RF signal at a second transceiver; generating second information as a reconstruction of the first information by processing the second RF signal using a decoder machine-learning network of the second transceiver; calculating a measure of distance between the second information and the first information; and updating at least one of the encoder machine-learning network of the first transceiver or the decoder machine-learning network of the second transceiver.

23 Claims, 8 Drawing Sheets

(56) References Cited

U.S. PATENT DOCUMENTS

| | | | | |
|---|---|---|---|---|
| 6,745,006 B2* | 6/2004 | Shaneyfelt | H04B 7/18521 | 455/12.1 |
| 7,020,462 B1* | 3/2006 | Wesel | H04B 7/2041 | 455/12.1 |
| 7,324,056 B2* | 1/2008 | Wesel | H04B 7/195 | 343/766 |
| 8,320,283 B2* | 11/2012 | Kim | H04L 1/0029 | 370/260 |
| 8,451,951 B2* | 5/2013 | Caire | H04L 1/0025 | 375/340 |
| 8,515,473 B2* | 8/2013 | Mody | H04K 3/44 | 455/509 |
| 8,553,796 B2* | 10/2013 | Oyman | H04B 7/0456 | 375/267 |
| 8,594,215 B2* | 11/2013 | Marzetta | H04L 25/03343 | 375/260 |
| 8,638,682 B2* | 1/2014 | Palanki | H04L 1/1887 | 370/252 |
| 8,660,202 B2* | 2/2014 | Jose | H04L 25/03343 | 375/267 |
| 8,868,117 B2* | 10/2014 | Lim | H04B 7/2606 | 455/500 |
| 8,879,670 B2* | 11/2014 | Gentile | H03M 13/114 | 375/340 |
| 8,885,745 B2* | 11/2014 | Oyman | H04L 1/0618 | 375/267 |
| 8,942,161 B2* | 1/2015 | Gupta | H04W 52/243 | 370/326 |
| 9,258,043 B2* | 2/2016 | Oyman | H04B 7/0456 | |
| 9,538,332 B1* | 1/2017 | Mendelson | H04W 40/244 | |
| 9,585,157 B2* | 2/2017 | Kim | H04W 16/12 | |
| 9,820,156 B2* | 11/2017 | Horn | H04W 16/10 | |
| 9,853,754 B1* | 12/2017 | Muakkit | H04B 7/18517 | |
| 9,919,723 B2* | 3/2018 | Bhagwatkar | A63H 17/395 | |
| 10,009,152 B2* | 6/2018 | Maaref | H04L 5/0053 | |
| 10,128,968 B2* | 11/2018 | Muakkit | H04B 7/18517 | |
| 10,200,875 B2* | 2/2019 | O'Shea | G06F 9/5038 | |
| 10,217,047 B2* | 2/2019 | O'Shea | H04L 1/0033 | |
| 10,305,553 B2* | 5/2019 | O'Shea | G06N 3/088 | |
| 10,396,919 B1* | 8/2019 | O'Shea | G06N 3/0454 | |
| 10,402,995 B2* | 9/2019 | Kwant | G06T 7/12 | |
| 10,429,486 B1* | 10/2019 | O'Shea | G01S 11/06 | |
| 10,460,251 B2* | 10/2019 | Okanohara | G06N 7/005 | |
| 10,531,415 B2* | 1/2020 | O'Shea | G06N 3/08 | |
| 10,541,765 B1* | 1/2020 | O'Shea | H04L 25/0254 | |
| 10,552,727 B2* | 2/2020 | Caspi | G06N 3/0445 | |
| 10,552,738 B2* | 2/2020 | Holt | G06N 3/084 | |
| 10,581,469 B1* | 3/2020 | O'Shea | G06N 3/08 | |
| 10,749,594 B1* | 8/2020 | O'Shea | H04B 7/18513 | |
| 2002/0147032 A1* | 10/2002 | Yoon | H04B 7/086 | 455/562.1 |
| 2007/0092020 A1* | 4/2007 | Seki | H04L 1/04 | 375/267 |
| 2007/0105576 A1* | 5/2007 | Gupta | H04W 52/243 | 455/509 |
| 2007/0162819 A1* | 7/2007 | Kawamoto | H04L 1/0043 | 714/758 |
| 2007/0280485 A1* | 12/2007 | Villemoes | H04S 7/30 | 381/22 |
| 2007/0286304 A1* | 12/2007 | Kim | H04B 7/0452 | 375/267 |
| 2008/0268862 A1* | 10/2008 | Kent | H04B 7/0632 | 455/452.2 |
| 2009/0047916 A1* | 2/2009 | Haykin | H04W 52/265 | 455/115.1 |
| 2009/0067528 A1* | 3/2009 | Loh | H04L 5/0046 | 375/267 |
| 2009/0124208 A1* | 5/2009 | Mody | H04W 12/069 | 455/67.11 |
| 2009/0154588 A1* | 6/2009 | Chen | H04L 5/0023 | 375/267 |
| 2010/0040163 A1* | 2/2010 | Caire | H04L 1/0003 | 375/261 |
| 2011/0150113 A1* | 6/2011 | Oyman | H04L 25/03343 | 375/260 |
| 2012/0171970 A1* | 7/2012 | Muhammad | H04B 1/0458 | 455/84 |
| 2012/0275538 A1* | 11/2012 | Kim | H04B 7/0617 | 375/295 |
| 2014/0010322 A1* | 1/2014 | Oyman | H04L 25/03343 | 375/267 |
| 2014/0222248 A1* | 8/2014 | Levien | B64C 39/024 | 701/2 |
| 2016/0039436 A1* | 2/2016 | Bhagwatkar | B61L 23/00 | 348/148 |
| 2016/0174040 A1* | 6/2016 | Roberts | G01S 5/08 | 455/456.1 |
| 2016/0359647 A1* | 12/2016 | Chen | H04B 7/0632 | |
| 2016/0365907 A1* | 12/2016 | Oyman | H04L 1/0019 | |
| 2016/0371316 A1* | 12/2016 | Okanohara | G06N 3/0454 | |
| 2017/0163465 A1* | 6/2017 | Piazza | H04L 5/06 | |
| 2017/0169357 A1* | 6/2017 | Caspi | G06N 3/08 | |
| 2018/0069642 A1* | 3/2018 | Muakkit | H04B 7/18517 | |
| 2018/0123732 A1* | 5/2018 | Axmon | H04L 1/0011 | |
| 2018/0174050 A1* | 6/2018 | Holt | G06N 3/084 | |
| 2018/0322388 A1* | 11/2018 | O'Shea | H04L 1/0036 | |
| 2018/0367192 A1* | 12/2018 | O'Shea | H04B 7/0452 | |
| 2019/0035101 A1* | 1/2019 | Kwant | G06N 3/0454 | |
| 2019/0042748 A1* | 2/2019 | Shabtai | G06F 21/566 | |
| 2019/0045191 A1* | 2/2019 | Day | H04N 19/14 | |
| 2019/0051013 A1* | 2/2019 | Kwant | G06T 7/77 | |
| 2019/0188565 A1* | 6/2019 | O'Shea | H04L 1/0036 | |
| 2019/0349037 A1* | 11/2019 | O'Shea | G06N 3/0454 | |
| 2020/0007200 A1* | 1/2020 | Schreck | H04B 7/0417 | |
| 2020/0007249 A1* | 1/2020 | Derr | G06N 3/088 | |
| 2020/0019877 A1* | 1/2020 | Okanohara | G06N 7/005 | |
| 2020/0041550 A1* | 2/2020 | Borean | G06N 3/0445 | |
| 2020/0064444 A1* | 2/2020 | Regani | G01S 7/415 | |

\* cited by examiner

```
                                    600
                                        ↴

┌─────────────────────────────────────────────────────────────┐
│  DETERMINING FIRST INFORMATION FOR TRANSMISSION FROM A      │
│  FIRST TRANSCEIVER                                     602  │
└─────────────────────────────────────────────────────────────┘
                              │
                              ▼
┌─────────────────────────────────────────────────────────────┐
│  GENERATING A FIRST RADIO FREQUENCY (RF) SIGNAL BY          │
│  PROCESSING THE FIRST INFORMATION USING AN ENCODER          │
│  MACHINE-LEARNING NETWORK OF THE FIRST TRANSCEIVER          │
│                                                        604  │
└─────────────────────────────────────────────────────────────┘
                              │
                              ▼
┌─────────────────────────────────────────────────────────────┐
│  TRANSMITTING THE FIRST RF SIGNAL FROM THE FIRST            │
│  TRANSCEIVER TO AT LEAST ONE OF A COMMUNICATIONS            │
│  SATELLITE OR A GROUND STATION THROUGH A FIRST              │
│  COMMUNICATION CHANNEL                                 606  │
└─────────────────────────────────────────────────────────────┘
                              │
                              ▼
┌─────────────────────────────────────────────────────────────┐
│  RECEIVING, FROM AT LEAST ONE OF THE COMMUNICATIONS         │
│  SATELLITE OR THE GROUND STATION THROUGH A SECOND           │
│  COMMUNICATION CHANNEL, A SECOND RF SIGNAL AT A SECOND      │
│  TRANSCEIVER                                           608  │
└─────────────────────────────────────────────────────────────┘
                              │
                              ▼
┌─────────────────────────────────────────────────────────────┐
│  GENERATING SECOND INFORMATION AS A RECONSTRUCTION OF       │
│  THE FIRST INFORMATION BY PROCESSING THE SECOND RF          │
│  SIGNAL USING A DECODER MACHINE-LEARNING NETWORK OF THE     │
│  SECOND TRANSCEIVER                                         │
│                                                        610  │
└─────────────────────────────────────────────────────────────┘
                              │
                              ▼
┌─────────────────────────────────────────────────────────────┐
│  CALCULATING A MEASURE OF DISTANCE BETWEEN THE SECOND       │
│  INFORMATION AND THE FIRST INFORMATION                 612  │
└─────────────────────────────────────────────────────────────┘
                              │
                              ▼
┌─────────────────────────────────────────────────────────────┐
│  UPDATING AT LEAST ONE OF THE ENCODER MACHINE-LEARNING      │
│  NETWORK OF THE FIRST TRANSCEIVER OR THE DECODER            │
│  MACHINE-LEARNING NETWORK OF THE SECOND TRANSCEIVER         │
│  BASED ON THE MEASURE OF DISTANCE BETWEEN THE SECOND        │
│  INFORMATION AND THE FIRST INFORMATION                 614  │
└─────────────────────────────────────────────────────────────┘
```

FIG. 6

LEARNING-BASED SPACE COMMUNICATIONS SYSTEMS

CROSS-REFERENCE TO RELATED APPLICATION

This application is a continuation of U.S. application Ser. No. 15/999,025, filed on Aug. 20, 2018, now allowed, which claims priority to U.S. Provisional Application Ser. No. 62/547,239, filed on Aug. 18, 2017. The disclosure of the prior applications are considered part of and is incorporated by reference in the disclosure of this application.

TECHNICAL FIELD

The present disclosure relates to machine learning and deployment of adaptive wireless communications, and in particular, for radio frequency (RF) signals for space communications systems.

BACKGROUND

Radio frequency (RF) waveforms are prevalent in many systems for communication, storage, sensing, measurements, and monitoring. RF waveforms are transmitted and received through various types of communication media, such as over the air, under water, or through outer space. In some scenarios, RF waveforms transmit information that is modulated onto one or more carrier waveforms operating at RF frequencies. In other scenarios, RF waveforms are themselves information, such as outputs of sensors or probes. Information that is carried in RF waveforms is typically processed, stored, and/or transported through other forms of communication, such as through an internal system bus in a computer or through local or wide-area networks.

SUMMARY

In general, the subject matter described in this disclosure can be embodied in methods, apparatuses, and systems for training and deploying machine-learning networks to communicate over RF channels, and specifically to encode and decode information for communication over RF channels for space communications systems.

According to one aspect of the subject matter described in this application, a method is performed by one or more processors configured to train one or more machine-learning networks to process information transmitted through a communication channel. The method includes: determining first information for transmission from a first transceiver; generating a first radio frequency (RF) signal by processing the first information using an encoder machine-learning network of the first transceiver; transmitting the first RF signal from the first transceiver to at least one of a communications satellite or a ground station through a first communication channel; and receiving, from at least one of the communications satellite or the ground station through a second communication channel, a second RF signal at a second transceiver. The second RF signal represents the first RF signal having been altered by at least one of transmission through the first communication channel, reception through the second communication channel, or transmission through a relay communication channel of at least one of the communications satellite or the ground station.

The method further includes: generating second information as a reconstruction of the first information by processing the second RF signal using a decoder machine-learning network of the second transceiver; calculating a measure of distance between the second information and the first information; and updating at least one of the encoder machine-learning network of the first transceiver or the decoder machine-learning network of the second transceiver based on the measure of distance between the second information and the first information, wherein the updating results in a value of the measure of distance below a predetermined threshold.

Implementations according to the aspect may include one or more of the following features. For example, the method may further include determining a channel gradient estimation that represents a difference between the first RF signal and the second RF signal. In some examples, the process of updating at least one of the encoder machine-learning network of the first transceiver or the decoder machine-learning network of the second transceiver incudes: determining an objective function including the measure of distance and the channel gradient estimation; calculating a rate of change of the objective function relative to variations in at least one of the encoder machine-learning network of the first transceiver or the decoder machine-learning network of the second transceiver; and determining a goal value of the objective function by using the rate of change of the objective function relative to the variations in at least one of the encoder machine-learning network or the decoder machine-learning network, wherein the goal value corresponds to a value that is within a predetermined range from a minimum of the objective function.

In some implementations, the method further includes determining, based on the second RF signal and the second information, feedback information that includes at least one of (i) the measure of distance between the second information and the first information, or (ii) performance information that indicates an estimated communication performance of at least one of the encoder machine-learning network or the decoder machine-learning network for communications through the first communication channel, the second communication channel, and the relay communication channel. In the same or other implementations, the process of updating at least one of the encoder machine-learning network of the first transceiver or the decoder machine-learning network of the second transceiver includes updating, in response to reception of the feedback information, at least one of the encoder machine-learning network of the first transceiver or the decoder machine-learning network of the second transceiver.

In some examples, the performance information may indicate at least one of (i) a signal to noise ratio (SNR) or received signal strength (RSS) of the second RF signal, (ii) delay spread caused by time-varying effects of the first communication channel, the second communication channel, and the relay communication channel, (iii) an error rate that indicates a rate of information altered from the first information through the communications relative to the first information, (iv) an oscillator stability of the first transceiver, the second transceiver, the communications satellite, or the ground station, or (v) an RF compression or distortion caused by nonlinearity in amplification or an analog signal processing of the first RF signal or the second RF signal.

In some implementations, the process of updating, in response to reception of the feedback information, at least one of the encoder machine-learning network of the first transceiver or the decoder machine-learning network of the second transceiver includes at least one of: updating at least one encoding network weight in one or more layers of the encoder machine-learning network of the first transceiver in response to reception of the feedback information; or updating at least one decoding network weight in one or more layers of the decoder machine-learning network of the second transceiver in response to reception of the feedback information.

In some implementations, the method further includes: obtaining historical performance information that includes a plurality of communication conditions and one or more learned weights of at least one of the encoder machine-learning network or the encoder machine-learning network corresponding to the plurality of communication conditions; determining a first condition of the plurality of communication conditions, wherein the first condition corresponds to the communications through the first communication channel, the second communication channel, and the relay communication channel; and selecting one or more learned weights corresponding to the first condition. In such implementations, the process of updating at least one of the encoder machine-learning network of the first transceiver or the decoder machine-learning network of the second transceiver includes at least one of: setting the selected one or more learned weights as at least one encoding network weight in one or more layers of the encoder machine-learning network of the first transceiver; or setting the selected one or more learned weights as at least one decoding network weight in one or more layers of the decoder machine-learning network of the second transceiver.

In some implementations, the method further includes: communicating a first analog RF waveform having a first modulation frequency between the second transceiver and at least one of the communications satellite or the ground station through the second communication channel in a state in which the first transceiver communicates a second analog RF waveform having the first modulation frequency with at least one of the communications satellite or the ground station through the first communication channel. In some examples, a modulation of the first analog RF waveform is orthogonal to a modulation of the second analog RF waveform. In other examples, a modulation of the first analog RF waveform is not orthogonal to a modulation of the second analog RF waveform.

In some implementations, the method further includes transmitting the feedback information from the second transceiver to the first transceiver through a third communication channel that is different from the first and second communication channels. In some examples, the third communication channel includes at least one of a radio communication channel, an acoustic communication channel, or an optical communication channel, or a wired communication channel between the second transceiver and the first transceiver.

In some implementations, the first communication channel includes at least one of a radio communication channel, an acoustic communication channel, or an optical communication channel, and the second communication channel includes at least one of a radio communication channel, an acoustic communication channel, or an optical communication channel.

In some implementations, the method further includes processing the first RF signal to generate a first analog RF waveform; and using one or more transmit antennas of the first transceiver to transmit the first analog RF waveform through the first communication channel. For example, processing of the first RF signal to generate the first analog RF waveform may include at least one of: amplifying power of the first RF signal to transmit to at least one of the communications satellite or the ground station; converting a frequency of the first RF signal corresponding to a reception frequency band of at least one of the communications satellite or the ground station; or filtering a noise signal from the first RF signal.

In some implementations, the method further includes: receiving a second analog RF waveform through the second communication channel using one or more receive antennas of the second transceiver, where the second analog RF waveform represents the first analog RF waveform having been altered by at least one of the first communication channel, the second communication channel, or the relay communication channel of at least one of the communications satellite or the ground station; and processing the second analog RF waveform to generate the second RF signal. For example, processing of the second analog RF waveform to generate the second RF signal includes at least one of: amplifying power of the second analog RF waveform to process through an analog to digital converter (ADC) of the second transceiver; converting a frequency of the second analog RF waveform corresponding to a frequency band of the ADC of the second transceiver; transforming the second analog RF waveform to digital form using the ADC; or filtering a noise signal from the second analog RF waveform before processing through the ADC.

In some implementations, at least one of the communications satellite or the ground station includes a phased array antenna configured to alter a direction of the second RF signal by altering a phase of the first RF signal.

Other implementations of the above and other aspects include corresponding systems, apparatuses, and computer programs, configured to perform the actions of the above methods, encoded on computer storage devices. A system of one or more computers can be so configured by virtue of software, firmware, hardware, or a combination of them installed on the system that in operation cause the system to perform the above-described actions. One or more computer programs can be so configured by virtue of having instructions that, when executed by data processing apparatus, cause the apparatus to perform the above-described actions.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 6 is a flowchart illustrating an example method of updating machine-learning encoder or decoder networks.

Like reference symbols in the various drawings indicate like elements.

DETAILED DESCRIPTION

Figure 1:
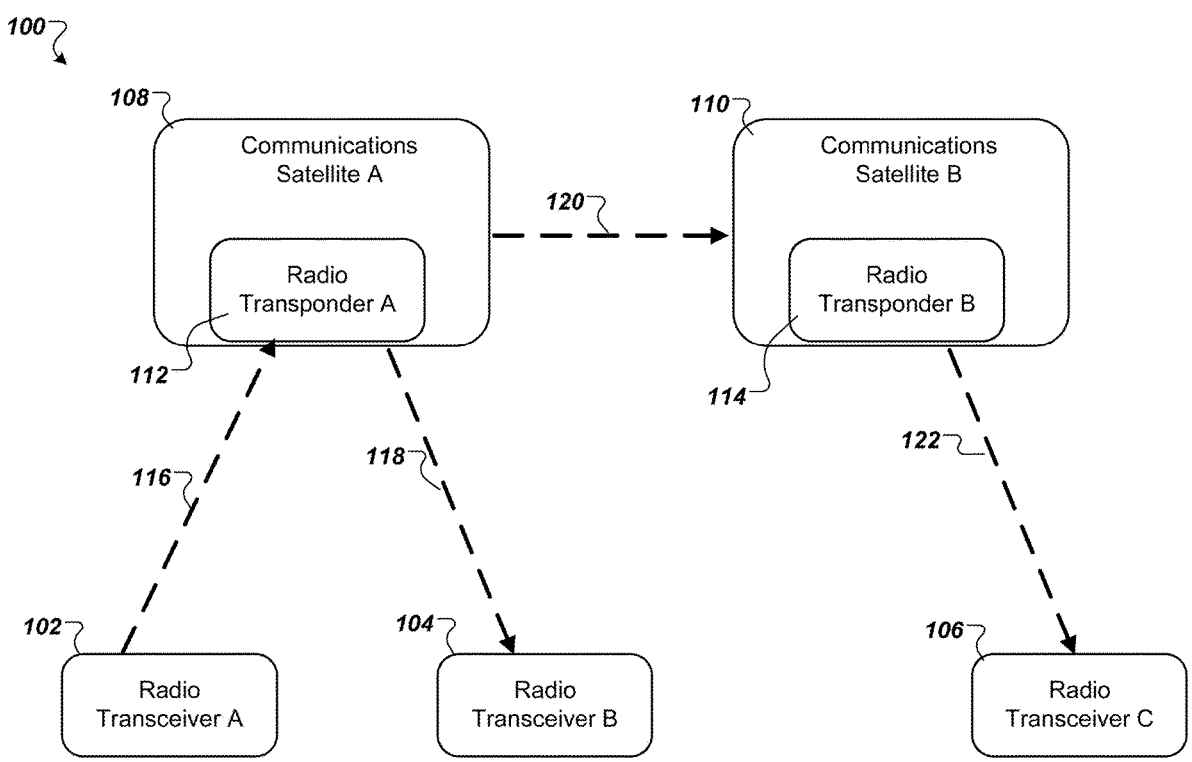
FIG. 1 illustrates an example of a satellite communications system including one or more radio transceivers and one or more radio transponders of communications satellites.

Systems and techniques are disclosed herein that enable machine learning and deployment of communication over an impaired RF channel. For example, one or more RF transceivers are disclosed herein that include a learned encoder and/or decoder network to communicate with each other through one or more spacecraft or ground stations. In some implementations, the spacecraft includes one or more communications satellites. In some implementations, the spacecraft includes other types of aerial vehicles, such as airplanes, drones, space shuttles, space stations, or space rockets. In some implementations, at least one machine-learning network is trained to encode information as a signal that is transmitted over a radio transmission channel, and to decode a received signal to recover the original information. The training may be designed to achieve various criteria such a low bit error rate, high power, low power, narrow bandwidth, wide bandwidth, high complexity, low complexity, high detectability, low detectability, low vulnerability to radio jamming, performing well in particular regimes such as at a low signal to noise (SNR) ratio or under specific types of fading or interference, and/or other criteria.

The results of training such machine-learning networks may then be utilized to deploy real-world encoders and decoders in communication scenarios to encode and decode information over various types of RF communication media. In some implementations, further learning and adaptation of the encoder and decoder may be implemented during deployment, based on feedback information. These encoders and decoders may replace or augment one or more signal processing functions such as modulation, demodulation, mapping, error correction, or other components which exist in those systems today.

In some implementations, an RF communications system includes a channel autoencoder that performs processes of training/updating the encoder network or the decoder network. The autoencoder may determine a method for information encoding (e.g., modulation method) for various communication environment such as over the air communications. For instance, the RF communications system may learn how to adapt to transmit or decode RF signals through hardware and wireless propagation channel impairments. In some examples, the RF communications system may train/update the encoder network or the decoder network to achieve a near-optimal level of performance (e.g., transmission bit rate, bit error rate, etc.) in satellite communication channels. An optimal level of performance (e.g., Shannon capacity) may be determined by a bandwidth and an SNR of the communication channels. In some implementations, the RF system may determine whether channel impairments or channel conditions change over time, and update the encoder network or the decoder network according to the change. In some examples, the RF communications system implements shared access to a radio transponder where multiple transceivers and users access the radio transponder to communicate multiple information streams in a shared frequency band based on learned encoding and decoding schemes.

An RF communications system may use specific modulation schemes (e.g., a standard modulation scheme such as Phase-Shift Keying (PSK), Quadrature Amplitude Modulation (QAM), Amplitude and Phase-Shift Keying (APSK), etc.) and forward error correction algorithms (e.g., convolutional codes, turbo-product codes, turbo-codes, low-density parity-check (ldpc) codes, etc.), which are rigid and have typically been optimized under additive white noise channel conditions. For example, digital television broadcast standards, which may carry voice or data, such as Digital Video Broadcasting (DVB)-S, DVB-S2 and DVB-S2X select a mode among from a set of modulation and encoding modes that are pre-defined to be used at different signal to noise ratios. The set of modulation and encoding modes are sometimes referred to as modulation and coding modes (MODCOD's). In these examples, the RF communication system may be limited to operate amplifiers or other hardware components of the system in a specified mode (e.g., a linear or near-linear mode) to achieve an expected performance level of communication.

In some implementations, the RF communication system includes encoder and/or decoder networks that are trained to adapt to operate at a near-optimal performance level under a wide range of signal to noise ratios as well as under a wide range of other non-linear impairments or distortions induced by hardware devices such as amplifiers, mixers, interferers, or other effects encountered during propagation. The RF communication system, using the learned encoder and/or decoder networks, may achieve a near-optimal communication performance level over a wide range of conditions by compensating for or inverting the collection of effects on the transmitted signal. For example, the near-optimal communication performance level corresponds to a level that is within a predetermined range from an optimal performance level such as the Shannon's capacity limit. In some examples, the RF communication system may not require idealized operating modes or an amplifier adjustment to achieve the near-optimal communication performance (e.g., linear amplifier modes, or spur free, distortion free hardware). For instance, the RF communication system can operate at more power efficient non-linear modes (e.g., in amplified saturation) or while using low cost non-linear distorting hardware while still achieving the near-optimal communication performance. In some implementations, the learned encoder and decoder networks, may improve the throughput (e.g., amount of communicated data), reliability of communications, resilience to interference or hardware failure, or ease of use of the satellite communications systems.

The disclosed methods, systems and apparatus are described in greater detail in the following sections with reference to a satellite communications system for ease of description. However, the description is also equally applicable to other types of spacecraft, such as such as airplanes, drones, balloons, terrestrial backhauls, space shuttles, space stations, or space rockets. For example, in the description below, the communications satellite (such as communications satellite A, or communications satellite B, or both, in FIG. 1) could be replaced by other types of spacecraft, such as a drone. In some implementations, the systems described herein include different types of spacecraft communicating with one another. For example, communications satellite can communicate with a drone, or a space shuttle, or both, in the implementation disclosed with reference to FIG. 1.

FIG. 1 illustrates an example of a satellite communications system including one or more radio transceivers and one or more radio transponders of communications satellites. For example, a communications system 100 includes a radio transceiver 102 that communicates with a radio transponder 112 of a communications satellite 108 through a communication channel 116. The system 100 further includes a radio transceiver 104 that communicates with the radio transponder 112 of the communications satellite 108 through a communication channel 118. In some examples, the system 100 transmits information or a representation of information (e.g., a transmitted waveform) from the radio transceiver 102 to radio transceiver 104 through the radio transponder 112. In some examples, the communication channels 116 and 118 may be a wireless channel or a space medium that allows transmission of RF signals.

In some implementations, the system 100 includes multiple radio transceivers that communicate with each other through one or more communications satellites that communicate with each other and with one or more radio transceivers. For example, as shown in FIG. 1, the radio transceiver 102 may communicate with a radio transceiver 106 through the radio transponder 112 of the communications satellite 108 and a radio transponder 114 of the communications satellite 110. In this case, the communications satellite 108 relays information to the communications satellite 110 through a communication channel 120. In some examples, the communication channel 120 may be a wireless channel or a space medium that allows transmission of RF signals.

In some implementations, the system 100 includes one or more ground stations. A ground station may be a fixed ground station, or a mobile transceiver that communicates with one or more communications satellites, one or more radio transceivers, or one or more ground stations. In some examples, the system 100 includes a wired communication channel between ground stations (e.g., a remote ground station, antenna, data center, etc.). For example, the communications satellite 108 or the communications satellite 110 may correspond to a ground station. In another example, one or more of the radio transceivers 102, 104, and 106 may correspond to a ground station or satellite gateway. In some examples, the radio transceivers 102, 104, 106 may be a satellite phone or any electronic device that includes an antenna or a satellite modem configured to communicate with at least one of communications satellites, ground stations, or other radio transceivers. In some implementations, the transceivers are both terrestrial and refer to a point-to-point backhaul communications link. For example, a microwave backhaul link may carry telephony or data, which may utilize one or more relays.

Figure 2:
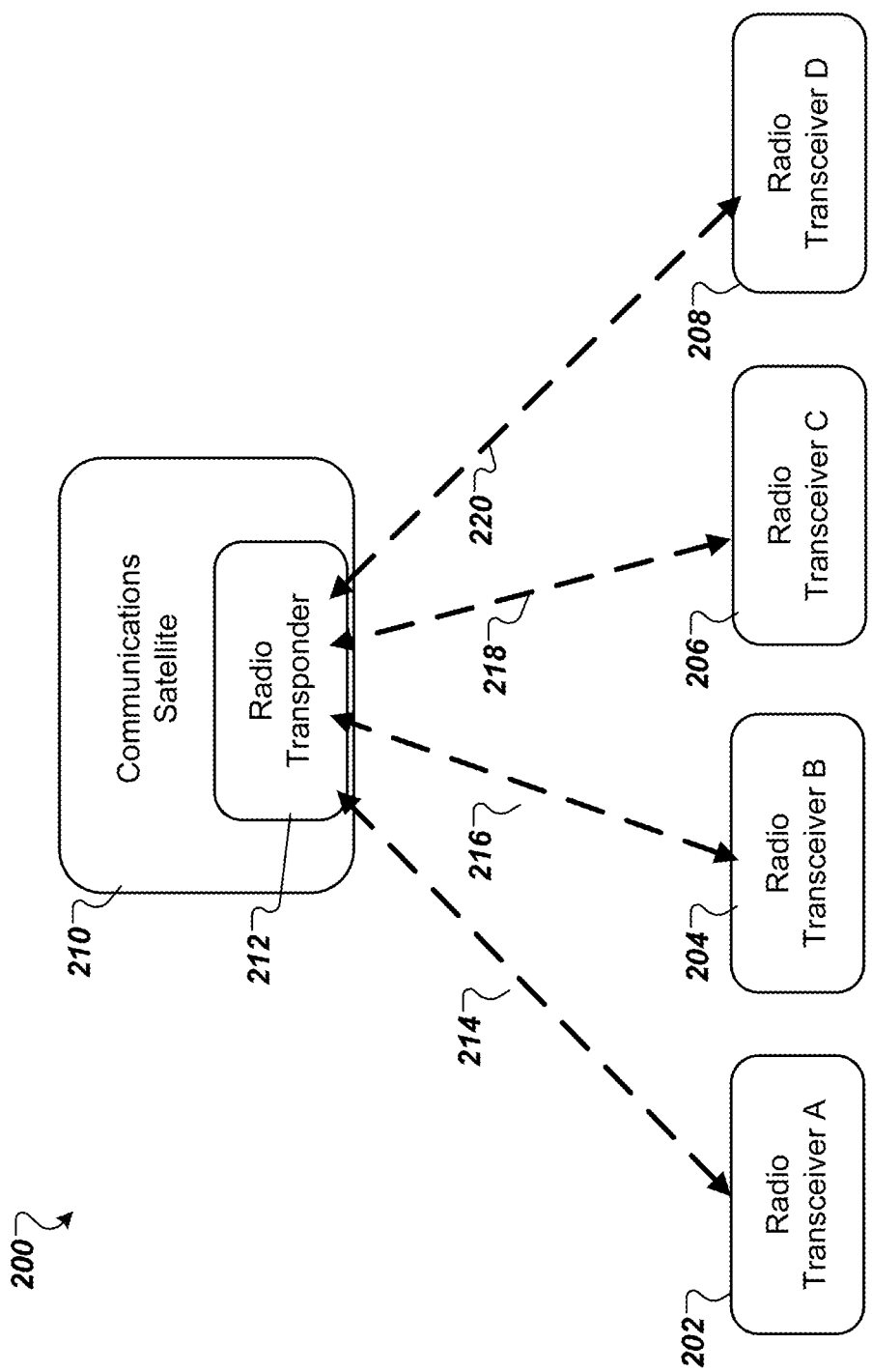
FIG. 2 illustrates an example of a satellite communications system including multiple radio transceivers and a single transponder of a communications satellite.

FIG. 2 illustrates an example of a satellite communications system including multiple radio transceivers and a single transponder of a communications satellite. For example, a multi-user system 200 includes multiple radio transceivers 202, 204, 206, and 208 that each communicate with a radio transponder 212 of a communications satellite 210. FIG. 2 shows four radio transceivers as one example, but other number(s) of radio transceivers are possible. The multiple radio transceivers may be spaced apart from each other and distributed worldwide. The radio transceivers are not limited to be arranged at specific locations, and may be mobile. In some implementations, the transponder employs antenna technologies such as beam forming or learned spatial encodings to communicate with multiple transceivers at different spatial locations while increasing re-use of frequency or spatial resources. In some implementations, the encoding and decoding method employ non-orthogonal encoding techniques to maximize multi-user capacity across the transponder, its users, and its requirements. In the non-orthogonal encoding techniques, a cross correlation operation with two different signals results in a non-zero value, which improves efficiency of encoding of information using a limited bandwidth.

The communication channels 214, 216, 218, and 220 may correspond to at least one of an uplink or a downlink that allows transmission of information or a representation of information from a radio transceiver to another radio transceiver directly or through a transponder. For instance, the radio transceiver 202 may transmit an RF signal including information to the radio transponder 212 through the communication channel 214 (uplink), and the radio transceiver 208 may receive an RF signal from the radio transponder 212 through the communication channel 220 (downlink). The communication channel 214 may also correspond to a downlink in case the radio transceiver 202 receives an RF signal from the radio transponder 212. Analogously, the communication channel 220 may also correspond to an uplink in case the radio transceiver 208 transmits an RF signal to the radio transponder 212.

In one example, each of the radio transceivers 202, 204, 206, and 208 is assigned to a unique orthogonal frequency for communication with the radio transponder 212 through one of the uplink and downlink. In some cases, the unique orthogonal frequencies may be predetermined or assigned by a dynamic frequency allocation algorithm, for example, as a communication standard or by a shared communications service. In other examples where the radio transceivers include learned encoder and/or decoder networks (see FIG. 3), the communication system 200 may learn to determine its own orthogonal or pseudo orthogonal modulation/encoding schemes to allow multiple transceivers to share a limited bandwidth of the radio transponder 212 more effectively, for example, by maximizing joint spatial, spectral, or encoding resources. For example, the radio transceiver 202 and the radio transceiver 206 may simultaneously communicate with the radio transponder 212 with a common frequency using learned encoding and decoding schemes that have been trained to adapt to communicate in the channel impairment conditions of the channels 214 and 218. In some cases, information encoding methods may be orthogonal or pseudo-orthogonal and frequency allocations may be orthogonal-pseudo, orthogonal, or fully overlapping.

In some implementations, a learned decoder network of the radio transceiver 204 is trained to distinguish a first RF signal transmitted through the channel 214 and a second RF signal transmitted through the communication channel 218 based on a difference (e.g., frequency shift, power attenuation, signal distortion, etc.) between the channel impairment conditions of the channels 214 and 218. Alternatively or in addition, learned encoder networks of the radio transceivers 202 and 206 are trained to generate (e.g., encode or modulate) the first RF signal and the second RF signal based on the difference between the channel impairment conditions of the communication channels 214, 216, and 218. In this way, the system 200 may achieve an efficient communication that allows multiple transceivers to share access to a single transponder having a limited bandwidth. In some cases, the learned encodings may allow a transceiver to transmit and receive on the same frequency band (e.g., full-duplex communications) by learning a decoder which compensates for outgoing encoder effects.

Figure 3:
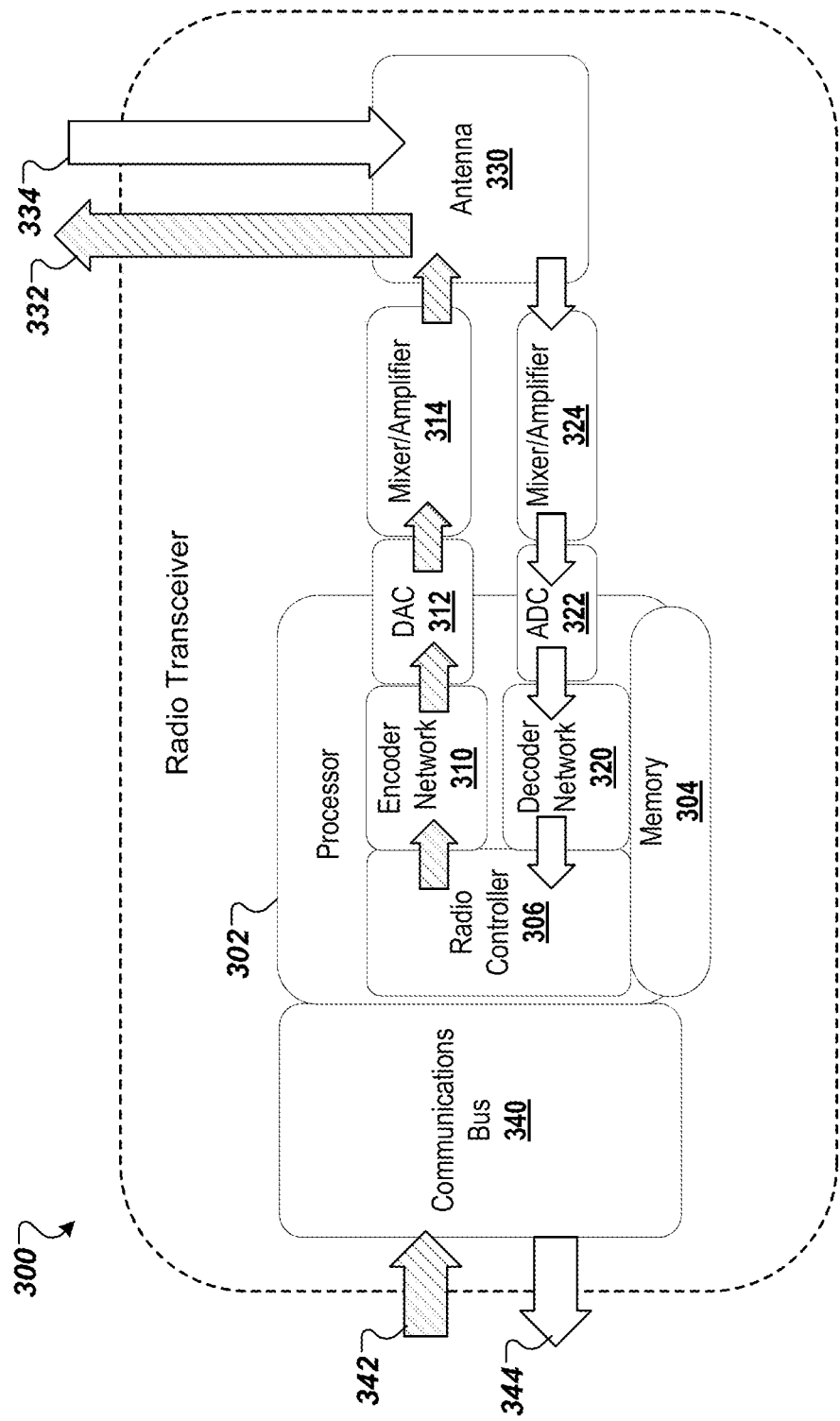
FIG. 3 illustrates an example of a radio transceiver that includes learned machine-learning encoder and decoder networks to communicate information with a communications satellite, a ground station, or another radio transceiver.

FIG. 3 illustrates an example of a radio transceiver that includes learned machine-learning encoder and decoder networks to communicate information with a communications satellite, a ground station, or another radio transceiver. For example, a radio transceiver 300 includes a processor 302 that generates information or performs computations related to encoding/decoding of information, a memory 304 that stores data structures and values, a radio controller 306 that controls transmission/reception of RF signals, and a communication bus 340 that communicates information 342, 344 (e.g., data bits, packets, symbols) with other devices (e.g., another processor). In some examples, the processor 302 may include at least a portion of the memory 304 or at least a portion of the radio controller 306. For instance, the processor 302 may be an integrated circuit that includes a memory device (e.g., random access memory) or a function block for radio control (e.g., modem circuits).

The radio transceiver 300 further includes one or both of encoder network 310 and decoder network 320. The encoder network 310 receives information from the processor 302 (e.g., the radio controller 306, the memory 304) and generates a representation of the information. In some cases, the information may be received from another device through the communication bus 340. For example, the communication bus 340 may include a network interface such as an Ethernet or Internet Protocol interface. The encoder network 310 may transform a format of the information to another format according to a learned encoding scheme. The radio transceiver 300 may further include a digital to analog converter (DAC) that interfaces with the encoder network 310 and that converts the information to an analog signal.

In some implementations, the radio transceiver 300 further includes transmitter processing components 314 that process the analog signal generated from the DAC 312. For instance, the processing components 314 (e.g., transmitter hardware) include a frequency mixer that mixes the analog signal with one or more signals to generate an RF waveform that includes one or more frequencies. In some cases, the frequency mixer may implement multiple stages of signal mixing. The processing components 314 may also include an amplifier that amplifies power of the RF waveform so that the amplified RF waveform can propagate to at least one of a communications satellite or a ground station. In some cases, the processing components 314 may include a frequency converter that converts a frequency of the RF waveform corresponding to a reception frequency band of at least one of the communications satellite or the ground station. The processing components 314 may further include a signal filter that shapes a signal or reduces a noise signal from the analog signal or RF waveform. The radio transceiver 300 may include an antenna 330 that transmits the RF waveform to a communications satellite or ground station through a communication channel 332.

In some implementations, the radio transceiver 300 receives, using the antenna 330, an RF waveform from a communications satellite or ground station through a communication channel 334. The radio transceiver 300 further includes receiver processing components 324 to process the RF waveform received from the antenna 330. For example, the receiver processing components 324 includes a frequency mixer that implements zero or more stages of frequency mixing with the RF waveform received from the antenna 330, an amplifier that amplifies power of the RF waveform, or a signal filter that reduces a noise signal from the received RF signal. The radio transceiver 300 includes an analog to a digital converter (ADC) 322 that converts the RF waveform or amplified RF waveform to a digital signal.

The radio transceiver 300 includes a learned decoder network 320 that converts the digital signal from the ADC 322 into estimated received information bits as a reconstruction of original information transmitted from another radio transceiver. The information bits reconstructed by the decoder network 320 may be further processed by the processors 302 or the radio controller 306, stored in the memory 304, or passed to the communications bus 340 for consumption elsewhere (e.g., on another processor). RF signals in communication between transceivers through a transponder may be impaired (e.g., distorted, shifted, delayed, attenuated, etc.) due to imperfections in hardware components of the transceivers or transponder or due to conditions in the propagation media. A level of impairment may vary from a transceiver to another, locations of the transceivers, or over time. The encoder network 310 and the decoder network 320 are trained to optimize encoding/decoding schemes to communicate information with the impaired RF signals. Further details of training and deployment of encoder and decoder networks are described below, for example, with reference to FIG. 5.

Figure 4:
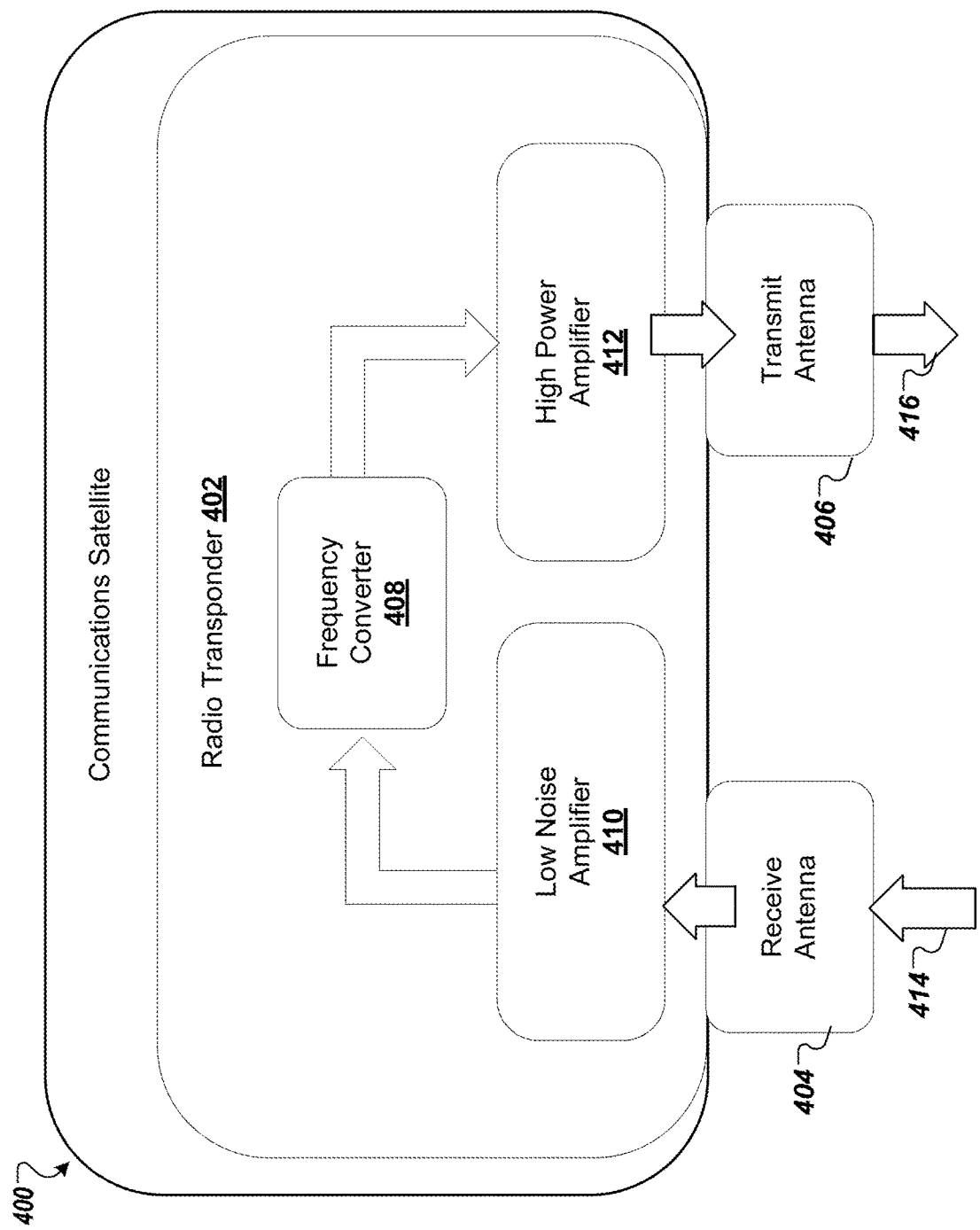
FIG. 4 illustrates an example of a communications satellite including a transponder.

FIG. 4 illustrates an example of a communications satellite including a transponder. As shown, communications satellite 400 includes a radio transponder 402 that relays received RF signals 414 to a transceiver, another communications satellite, or a ground station. For example, the communications satellite 400 may be a component of a bent-pipe radio communications system that receives RF signals from Earth and sends amplified/converted RF signals back to Earth. The communications satellite 400 may host a hardware payload of the radio transponder 402. The communications satellite 400 includes a receive antenna 404 that receives the RF signal 414 from a transceiver, another communications satellite, or a ground station, a transmit antenna 406 that transmits an RF signal 416 to a transceiver, another communications satellite, or a ground station. In some cases, the receive antenna 404 and the transmit antenna 406 may be implemented as one common antenna. In other cases, the receive antenna 404 is independent from the transmit antenna 406. In some examples, the radio transponder 402 may include one or both of the receive antenna 404 and the transmit antenna 406. In some implementations, the communications satellite 400 includes a phased array antenna configured to alter a direction of the transmitted RF signal 416 by altering a phase of the received RF signal 414.

In some implementations, the radio transponder 402 further includes a low noise amplifier (LNA) 410 that amplifies power of the received RF signal 414 which may have a low power level (e.g., −120 dBm or lower) due to path loss (e.g., a long travel distance from Earth). The LNA 410 may amplify the power level, for example, to −70 dBm to process through a frequency converter 408. The frequency converter 408 includes one or more stages of oscillators and frequency mixers that convert a frequency of the received RF signal 414 to a new frequency for transmission. The radio transponder 402 further includes a transmission or high power amplifier 412 that provides transmit power to the RF signal 416 that is transmitted to a transceiver or ground station on Earth, or another communications satellite in space. In some examples, the high power amplifier 412 uses a higher power level than the LNA 410 to provide sufficient transmit power to the RF signal 416. In some cases, the power usages of the high power amplifier 412 may be limited by a power budget of the communications satellite 400, and may induce linear or non-linear effects which factor into the encoding and decoding choice of the signal.

One or more components of the communications satellite 400 or the radio transponder 402 have imperfections from their idealized or theoretical models, which may result in impairment (e.g., distortion, delays, frequency/phase shift, attenuation, etc.) in radio signals passing through the components from the receive antenna 404 to the transmit antenna 406. A communication route of the radio signals from the receive antenna 404 to the transmit antenna 406 through the radio transponder 402 may be subsumed to a relay communication channel at the communications satellite 400.

Figure 5:
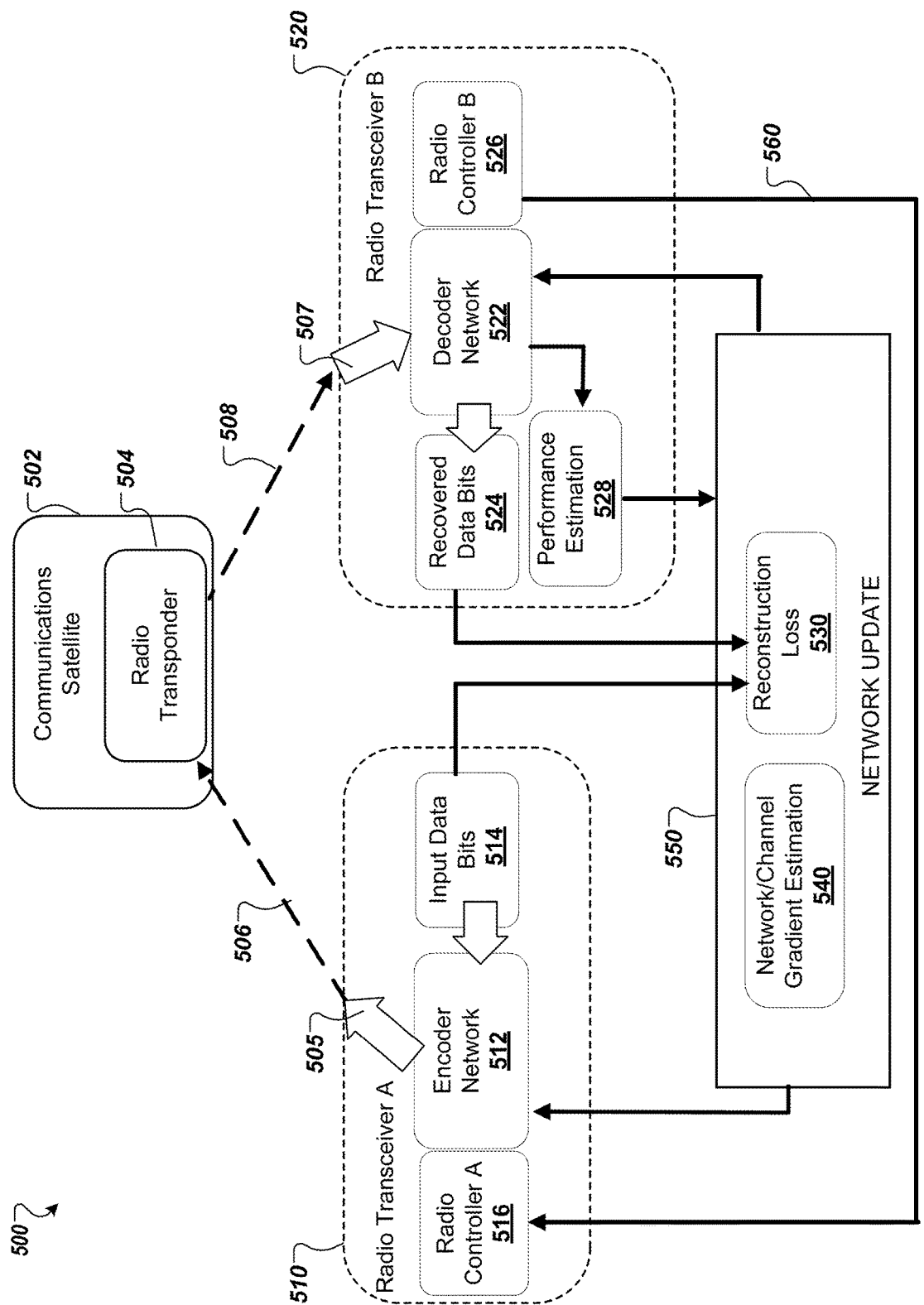
FIG. 5 illustrates an example of a satellite communications system that updates machine-learning encoder or decoder networks based on a gradient estimation of a communication channel and information reconstruction loss between radio transceivers.

FIG. 5 illustrates an example of a satellite communications system that updates machine-learning encoder or decoder networks based on a gradient estimation of a communication channel and information reconstruction loss between radio transceivers. For example, an RF communication system 500 includes radio transceivers 510 and 520, and a communications satellite 502 that includes a radio transponder 504. The RF system 500 may correspond to the system 100 or 200 discussed above with reference to FIGS. 1 and 2. The radio transceivers 510 and 520 may correspond to the radio transceiver 300 discussed above with reference to FIG. 3, or one or more of the radio transceivers 102, 104, 106, 202, 204, 206, or 208 of FIGS. 1 and 2.

For example, the radio transceiver 510 includes an encoder network 512 and a radio controller 516. The radio transceiver 510 may include other components such as a decoder network and processor as discussed above with reference to FIG. 3, which are omitted in FIG. 5 for simplicity. The radio transceiver 520 includes a decoder network 522 and radio controller 526. The radio transceiver 520 may also include other components such as an encoder network and processor as discussed above with reference to FIG. 3, which are omitted in FIG. 5 for simplicity. That is, the radio transceivers 510 and 520 may include one or both of an encoder network and a decoder network, and information may be transmitted in either of from the radio transceivers 510 to the radio transceivers 520 or from the radio transceivers 520 to the radio transceivers 510.

The encoder network 512 of the radio transceiver 510 obtains input data 514 (e.g., data bits, packets, symbols, etc.) which may have been produced by a processor or radio controller 516 of the radio transceiver 510 or received through a communication bus (e.g., the communication bus 340 in FIG. 3) as discussed above. The encoder network 512 converts the input data 514 to a digital signal representing the input data 514 according to a learned encoding scheme. The radio transceiver 510 converts, using one or more transmitter components (e.g., the processing components 314 in FIG. 3), the digital signal to an analog signal (e.g., an RF signal 505) for transmission through a communication channel 506. The communication channel 506 may include at least one of a radio communication channel, an acoustic communication channel, or an optical communication channel.

The transponder 504 of the communications satellite 502 receives the RF signal 505, which may have been altered by transmission through the communication channel 506. The transponder 504 may amplify power and/or convert a frequency of the received RF signal 505, and re-transmit the amplified/converted RF signal through a communication channel 508. In some examples, the communications satellite 502 may correspond to a ground station. The transponder 504 may be implemented as a simulation of the actual hardware components, for example, in encoder/decoder network training, validating, or testing scenarios. In some implementations, the transponder performs additional digital signal processing or decoding and/or encoding of signals to further facilitate communications between ground stations and satellites.

The radio transceiver 520 receives an analog signal (e.g., an RF signal 507) through a communication channel 508. The RF signal 507 may have been altered from the RF signal transmitted from the transponder 504 by transmission through the communication channel 508 or reception at the radio transceiver 520 due to the hardware or environmental imperfections discussed above. The radio transceiver 520 converts the RF signal 507 to a digital signal using one or more receiver components (e.g., the processing components 324 in FIG. 3). The decoder network 522 decodes or extracts information from the digital signal to generate recovered data 524 as a reconstruction of the input data 514. The communication channel 508 may include at least one of a radio communication channel, an acoustic communication channel, or an optical communication channel.

In some examples, the input data 514 carried by the RF signal 505 may not be fully recovered from the RF signal 507 at the radio transceiver 520, which results in data reconstruction loss at recovered data 524. For example, some data bits in the input data 514 may be absent from or altered in the recovered data 524. In some implementations, the RF system 500 may define a reconstruction loss function 530 that represents a difference between the input data 514 and the recovered data 524. The reconstruction loss function 530 indicates an accuracy or reliability of communication through the communication channels 506 and 508, a relay channel at the transponder 504, and various hardware components of the radio transceivers 510, 520 and the transponder 504. For example, a decrease of the reconstruction loss function 530 indicates an increase of the accuracy or reliability of communication.

In some implementations, the RF system 500 performs a network update process 550 that trains or updates the encoder network 512 or the decoder network 522 to reduce the reconstruction loss function 530, or another loss function to improve communication system performance. In some implementations, the encoder network 512 may be trained to achieve various types of objective functions including at least one of a measure of reconstruction error, a measure of computational complexity, bandwidth, SNR, bit error, frame error, packet error, latency, power, or various combinations therefor, and other objectives. The decoder network 522 may include a machine-learning network that learns how to decode a received signal 507 into reconstructed data 524 that approximates the original input data 514. During training, the encoder network 512 and/or decoder network 522 may be trained by the network update process 550. The encoder network 512 and decoder network 522 may be trained to achieve goal values of the various types of objective functions.

In some implementations, the encoder network 512 and the decoder network 522 includes artificial neural networks that comprise one or more connected layers of parametric multiplications, additions, weights, and non-linearities (e.g., deep dense neural networks with rectified linear unit activations). In such scenarios, updating the encoder network 512 and/or decoder network 522 may include updating weights of the neural network layers, or updating connectivity in the neural network layers, or other modifications of the neural network architecture, so as to modify a mapping of inputs to outputs.

In some implementations, the network update process 550 includes a channel gradient estimation 540 that computes an estimated alteration of RF signals using analytic models of the radio transceivers 510 and 520, the transponder 504, and communication channels 506 and 508. For example, the channel gradient estimation 540 may be implemented as a transfer function between an output signal (i.e., the transmitted RF signal 505) of the encoder network 512 and an input signal (i.e., the received signal 507) to the decoder network 522. In some implementations, the network update process 550 may utilize one or both of the channel gradient estimation 540 and reconstruction loss 530 to train/update the encoder network 512 or the decoder network 522. For example, the RF system 500 may, combining the channel gradient estimation and/or SNR estimation in the update process 550, determinate an optimum or goal level (e.g., Shannon capacity) of performance in communication using the encoder network 512 or the decoder network 522. In some implementations, the RF system 500 including the relay channel of the transponder 504 may perform an end-to-end optimization process in which both of the learned encoder network 512 and the decoder network 522 are trained to adapt to communicate in a given channel impairment for communication of RF signals.

In some implementations, the radio transceiver 520 includes a performance estimation module 528 that estimates information about channel conditions (e.g., SNR, delay spread, bit error rate, symbol error distance, oscillator stability, radio compression curve, etc.). For example, the performance estimation module 528 may estimate the channel conditions based on an output from the decoder network 522. In some cases, the performance estimation module 528 may include operations or algorithms for cyclic redundancy check (CRC), quality of service (QoS), or checksums, for instance, to estimate performance of the RF system 500 based on the output from the decoder network 522. For example, an error rate, decoder errors or error gradients could be estimated from errors based on CRC detection, or forward error corrections, or other protocol encoded means of transmitting information.

In some implementations, a performance estimation from the performance estimation module 528 may be provided to the network update process 550 to train/update the encoder network 512. In some implementations, the performance estimation is fed back to the radio transceiver 510. Feedback of the performance estimation may enable a rapid adaptation of the radio signal encoding to an optimal mode for the capacity (e.g., transmission data rate) and impairments present in the given communication channel(s) and hardware components.

In some examples, a radio controller 526 of the radio transceiver 520 may transmit information regarding the performance estimation to a radio controller 516 of the radio transceiver 510 through a communication link 560. As one example, the radio controller 526 may determine a set of encoder weights to be used by the encoder network 512 of the radio transceiver 510 based on the performance estimation at the transceiver 520, and transmit the set of encoder weights through the communication link 560. The communication link 560 may be a wireless channel, a wired connection, or other communications path. In some implementations, the encoding mode is indicated within a protocol field, which specifies the decoder mode to use. For example, in some cases, the header or protocol control information may be encoded in a standard encoding mode to facilitate specifying an encoder mode and a decoder mode to use corresponding to the encoder mode.

In some implementations, the network update process 550 may train/update the encoder network 512 or the decoder network 522 in an offline environment using simulation or a fixed or variable set of effects and channel impairments, or a set of stochastic channel models fit to measured channel responses. In some implementations, the network update process 550 may be implemented in an online environment over the air communication in real-use (e.g., deployed) scenarios. In some cases, the encoder network 512 or the decoder network 522 may be deployed after being trained with limited samples and channel conditions, and further updated using real-world samples in various channel conditions. In this case, performance can be optimized within a specific hardware and deployment scenario, to maximize capacity, efficiency, and other metrics within the transmission hardware and effects of a specific channel.

In some implementations, the decoder network 522 is trained independently using at least one of the recovered data 524, the performance estimation 528, or local gradients within the decoder network 522. For example, in some cases, the input data 514 or information regarding the communication channels 506, 508 may not be available for the network update process 550. In this case, the network update process 550 may vary weights of the decoder network 522 to find an optimum set of weights of the decoder network 522 to achieve a goal value of the performance estimation 528 or the local gradients.

In some implementations, both of the encoder network 512 and the decoder network 522 are updated/trained together based on at least one of the channel gradient estimation 540, the reconstruction loss 530, or other performance metric driven loss functions. In some examples, the RF system 500 may include independent communication channels (e.g., side-channel communications routes) for communication of information regarding the channel gradient estimation 540 and for communication of the input data 514 and recovered data 524. In this way, the RF system 500 may perform the training/updating process in a distributed way. The side-channel communications routes may be implemented using wireless communication protocols such as a radio communication channel, an acoustic communication channel, or an optical communication channel, or a wired communication channel between the radio transceiver 520 and the radio transceiver 510.

In some implementations, the radio controller 516 controls the encoder network 512 to select weights based on historical information about performance under different channel impairments, or predictive information about forthcoming channel conditions. Analogously, the radio controller 526 may control the decoder network 522 to select weights based on historical information about performance under different channel impairments, or control information transmitted through some protocol indicating the proper decoding scheme. For example, the radio controllers 516 and 526 may make the selection from a state machine or a lookup table that includes sets of weights for the encoder network 512 or the decoder network 522 established based on historical information about communication performance under various impairment conditions. In some examples, the RF system 500, by applying a set of weights among the sets of weights to at least one of the encoder network 512 or the decoder network 522, allows multiple radio transceivers 510 and 520 to communicate with each other through the transponder 504 in an optimal or near-optimal performance.

In some implementations, the radio controllers 516 controls the encoder network 512 to select weights based on historical information about performance under different channel impairments and future predicted or current performance information received from the radio controller 526. For instance, the radio controllers 516 may include a set of learned transmission schemes (e.g., encoding/modulation schemes), and actively switch between the learned transmission schemes based on the performance information fed back from the radio controller 526. In some examples, the channel/hardware impairment may vary over time or be affected by outside effects such as interference, signal jamming, hardware malfunction, weather, temperature, etc. The RF system 500 may maintain an optimal or a near-optimal operating mode by using the performance information directly fed back to the encoder network 512 to form a more dynamic operating mode to adapt to the change of communication conditions.

In some implementations, the encoder network 512 or the decoder network 522 may be trained (updated) using an objective function that includes the channel gradient estimation 540 and reconstruction loss 530. The network update process 550 determines one or more weights of at least one of the encoder network 512 or the decoder network 522 based on outputs of the objective function. In some examples, the network update process 550 may utilize a gradient descent technique with back propagation for minimizing the reconstruction loss 530. For example, the network update process 550 may use a rate of change of the objective function (e.g., a derivative of the objective function) to bring a value of the objective function to a goal value that can be a minimum value of the objective function or a value within a predetermined range from the minimum value. In other examples, the update process 530 may utilize other optimization techniques such as a stochastic gradient descent, RMSProp, or Adam optimization algorithms. The RF system 500 may determine an optimum set of weights or connectivity of the encoder network 512 or the decoder network 522, which enables a reliable communication of information within a threshold data error rate in a given channel impairment condition through multiple radio transceivers 510, 520, and the transponder 504.

In scenarios of deployment, the encoder network 512 and decoder network 522 may implement encoding and decoding techniques that were previously learned from training, or may be (further) trained during deployment. The encoder network 512 and decoder network 522 may be deployed in various application scenarios to perform communication, using the encoding and decoding representations that were learned during training. In some implementations, the encoder network 512 and/or decoder network 522 may be further updated during deployment based on real-time performance results such as reconstruction error, power consumption, delay, phase change, frequency shift, etc. In these cases, error feedback of loss functions may occur in some instances via a communications bus, or a protocol message within the wireless system which can be used to update the encoder network 512 and/or the decoder network 522, along with information to help characterize the response of the RF channels 506, 508 through the transponder 504.

The input data 514 and recovered data 524 may be any suitable form of information that is to be communicated over a channel, such as a stream of bits, packets, discrete-time signals, or continuous-time waveforms. Implementations disclosed herein are not limited to any particular type of input data 514 and recovered data 524, and are generally applicable to learn encoding and decoding techniques for communicating a wide variety of types of information over the RF channels 506 and 508 through the transponder 504.

In some implementations, the radio transceivers 510 and 520 employ one or more signal processing operations, which are suited to the type of RF communication domain. As examples, the encoder network 512, decoder network 522, and/or other processing components of the radio transceivers 510 and 520 may implement filtering, modulation, analog-to-digital (A/D) or digital-to-analog (D/A) conversion, equalization, or other signal processing methods that may be suitable for a particular types of RF signals or communication domains. In some implementations, the encoder network 512 and/or decoder network 522 may implement one or more transmit and receive antennas, and other hardware or software suitable for transmitting RF signals 505 and receiving RF signals 507 through the transponder 504.

Therefore, in such scenarios, as shown in the example of FIG. 5, the transmitted signal 505 and received signal 507 may represent actual RF waveforms that are transmitted and received over the RF channels 506 and 508, respectively, through one or more antennas. Thus, the encoder network 512 and decoder network 522 represent generalized mappings between data 514/524 and RF waveforms 505/507.

By contrast, in some implementations, the RF system 500 may implement signal processing and RF transmission/reception processes separately from the encoder network 512 and decoder network 522. In such implementations, one or more signal transmission and/or signal reception components, such as filtering, modulation, A/D or D/A conversion, single or multiple antennas, etc., may be represented as part of the channel 506 or 508. The impairments in the channels 506, 508 may therefore include transmitter/receiver effects, such as filtering impairments, additive noise, or other impairments in the transmitter and/or receiver components. Therefore, in such scenarios, the transmitted signal 505 and received signal 507 represent intermediate representations of data 514/524, and the channels 506, 508 and the transponder 504 represent a general transformation of those intermediate representations of information to and from actual RF waveforms that are transmitted and received over an RF medium. For example, the transmitted signal 505 and received signal 507 may represent basis coefficients for RF waveforms, time-domain samples of RF waveforms, distributions over RF waveform values, or other intermediate representations that may be transformed to and from RF waveforms.

In scenarios of training, the recovered data 524 may be compared with the original input data 514 or estimates thereof (e.g., based on other protocol, parity, or decoding information), and the encoder network 512 and/or the decoder network 522 may be trained (updated) based on results of the reconstruction. In some implementations, updating the encoder network 512 and/or decoder network 522 may also be based on other factors, such as computational complexity of the machine-learning networks (which can be measured, for example, by the number of parameters, number of multiplies/adds, execution time, Kolmogorov complexity, or otherwise), transmission bandwidth or power used to communicate over the channels 506 and 508 through the transponder 504, or various combinations thereof and other metrics.

The encoder network 512 and the decoder network 522 may be configured to encode and decode using any suitable machine-learning technique. In general, the encoder network 512 may be configured to learn a mapping from input data 514 into a lower-dimensional or higher-dimensional representation as the transmitted signal 505. Analogously, the decoder network 522 may be configured to learn a reverse mapping from a lower-dimensional or higher-dimensional received signal 507 into the recovered data 524.

As an example, the mappings that are implemented in the encoder network 512 and decoder network 522 may involve learning a set of basis functions and/or mappings for RF signals. In such scenarios, for a particular set of basis functions, the encoder network 512 may transform the input data 514 into a set of basis coefficients corresponding to those basis functions, and the basis coefficients may then be used to generate a transmitted RF waveform (for example, by taking a weighted combination of the basis functions weighted by the basis coefficients). Analogously, the decoder network 522 may generate the recovered data 524 by generating a set of basis coefficients from a received RF waveform (for example by taking projections of the received RF waveform onto the set of basis functions). The basis functions themselves may be any suitable orthogonal or non-orthogonal set of basis functions, subject to appropriate constraints on energy, amplitude, bandwidth, or other conditions.

During deployment, in some implementations, the encoder network 512 and/or decoder network 522 may utilize simplified encoding and decoding techniques based on results of training machine-learning networks. For example, the encoder network 512 and/or decoder network 522 may utilize approximations or compact look up tables based on the learned encoding/decoding mappings. In such deployment scenarios, the encoder network 512 and/or decoder network 522 may implement more simplified structures, rather than a full machine-learning network. Techniques such as distillation may be used to train smaller networks which perform the same signal processing function.

In some implementations, the encoder network 512 and/or decoder network 522 may include one or more fixed components or algorithms that are designed to facilitate communication over RF channels, such as expert synchronizers, equalizers, OFDM (orthogonal frequency division multiplexing) subcarrier mappings, etc. As such, during training, the encoder network 512 and/or decoder network 522 may be trained to learn encoding/decoding techniques that are suitable for such fixed components or algorithms.

RF signals that are transmitted and received by the RF system 500 may include any suitable radio-frequency signal, such as acoustic signals, optical signals, or other analog waveforms. The spectrum of RF signals that are processed by the RF system 500 may be in a range of 1 kHz to 300 GHz. For example, such RF signals include very low frequency (VLF) RF signals between 1 kHz to 30 kHz, low frequency (LF) RF signals between 30 kHz to 300 kHz, medium frequency (MF) RF signals between 300 kHz to 1 MHz, high frequency (HF) RF signals between 1 MHz to 30 MHz, and higher-frequency RF signals up to 300 GHz.

FIG. 6 is a flowchart illustrating an example method of updating machine-learning encoder or decoder networks. For example, a method 600 implements training/updating of one or more machine-learning networks to process information transmitted through a communication channel. The method 600 may be performed by one or more processors, such as one or more Central Processing Units (CPUs), Graphics Processing Units (GPUs), Digital Signal Processors (DSPs), Field Programmable Gate Arrays (FPGAs), Application Specific Integrated Circuits (ASICs), Tensor Processing Units (TPUs), dedicated digital tensor logic, neuromorphic chips, or vector accelerators that execute instructions encoded on a computer storage medium.

In some implementations, the method 600 is used for space communications. For example, the operations described in method 600 are performed by one or more transceivers such as radio transceiver 102, 104, or 106, as described with respect to FIG. 1, for communicating with satellites in a space communications system such as communications satellite 108, or 110, or both.

The method 600 may be performed by one or more processor configured to train one or more machine-learning networks to process information transmitted through a communication channel. In some examples, the method 600 includes at least one of: training, using a transmitter device in a communications system that includes the communication channel to a communications satellite or ground station, the encoder machine-learning network, the decoder machine-learning network; or training, using a receiver device in the communications system, the encoder machine-learning network, and the decoder machine-learning network. In some examples, the transmitter device and the receiver device may be integrated into a single device such as a radio transceiver.

The method 600 includes determining first information for transmission from a first transceiver (602). The first information may be any suitable discrete-time, analog, discrete-valued, or continuous-valued information or input data. In some instances, this input information may be whitened discrete bits, packets, or symbols, or in other cases, it may follow the distribution of a non-whitened information source.

The method 600 further generating a first radio frequency (RF) signal by processing the first information using an encoder machine-learning network of the first transceiver (604). For example, the first RF signal may represent an analog RF waveform that is transmitted over a channel, or may be an intermediate representation (e.g., samples, basis coefficients, distributions over RF waveforms, etc.) that undergoes further processing (e.g., filtering, mixing, amplification, D/A conversion, modulation, etc.) to generate an analog RF waveform. This encoding process may utilize any suitable mapping from an input information space into an RF signal space, as discussed in regard to FIG. 5. In some examples, the first RF signal may be an analog waveform suitable for Very Small Aperture Terminal (VSAT) communication systems, point-to-point communications, or mesh satellite communication systems.

In some implementations, the method 600 includes at least one of: amplifying power of the first RF signal to transmit to at least one of the communications satellite or the ground station; converting a frequency of the first RF signal corresponding to a reception frequency band of at least one of the communications satellite or the ground station; or filtering a noise signal from the first RF signal. For instance, as discussed above with reference to FIG. 3, the first radio transceiver includes the transmitter processing components 314 such as a signal amplifier, frequency mixer, and a signal filter to process analog signals suitable for transmission through a communication channel.

The method 600 further includes transmitting the first RF signal from the first transceiver to at least one of a communications satellite or a ground station through a first communication channel (606). For instance, the first transceiver may include one or more transmit antennas to transmit the first RF signal or a first analog RF waveform generated from the first RF signal through the first communication channel. The communications satellite or ground station may include a receiver antenna that receives the first RF signal from the first transceiver.

The method 600 further includes receiving, from at least one of the communications satellite or the ground station through a second communication channel, a second RF signal at a second transceiver (608). As discussed above with reference to FIG. 5, communications channels and/or hardware components of an RF communication system may include impairments that causes alteration of signal such as signal distortion, power attenuation, frequency shift, phase shift, delay spread, etc. The second RF signal represents the first RF signal having been altered by at least one of transmission through the first communication channel, reception through the second communication channel, or transmission through a relay communication channel of at least one of the communications satellite or the ground station.

In some implementations, the second transceiver includes one or more receive antennas configured to receive a second analog RF waveform through the second communication channel. The second analog RF waveform represents the first analog RF waveform having been altered by at least one of the first communication channel, the second communication channel, or the relay communication channel of at least one of the communications satellite or the ground station.

In some examples, the second analog RF waveform may be processed to generate the second RF signal. For instance, the method 600 may further includes at least one of: amplifying power of the second analog RF waveform to process through an analog to digital converter (ADC) of the second transceiver; converting a frequency of the second analog RF waveform corresponding to a frequency band of the ADC of the second transceiver; transforming the second analog RF waveform to digital form using the ADC; or filtering a noise signal from the second analog RF waveform before processing through the ADC. As discussed above with reference to FIG. 3, the second radio transceiver may include the receiver processing components 324 such as a signal amplifier, frequency mixer, and a signal filter to process analog signals suitable for a following decoding process.

The method 600 further includes generating second information as a reconstruction of the first information by processing the second RF signal using a decoder machine-learning network of the second transceiver (610). This decoding process may utilize any suitable mapping from an RF signal space into reconstructed information space, as discussed above in regards to FIG. 5.

The method 600 further includes calculating a measure of distance between the second information and the first information (612). The measure of distance may be implemented as a loss function and may represent a difference or error between the original input information and the second (reconstructed) information. For example, the measure of distance may include cross-entropy, a mean squared error, a mean average error, or other distance metrics (e.g., f-divergence, Kullback-Leibler divergence, total variation distance, etc.), or may combine several geometric and/or entropy-based distance metrics into an aggregate expression for distance.

The method 600 further includes updating at least one of the encoder machine-learning network of the first transceiver or the decoder machine-learning network of the second transceiver based on the measure of distance between the second information and the first information (614). The updating may result in a value of the measure of distance below a predetermined threshold. This updating process 614 may be applied to the encoder network and/or the decoder network in a joint or iterative manner, or individually. The updates may generally include updating any suitable machine-learning network feature of the encoder network and/or decoder network, such as network weights, architecture choice, machine-learning model, or other parameter or connectivity design. As an example, in some implementations, if the encoder network and/or decoder network are trained to learn a set of basis functions for communicating over a RF channel, then the updating process 614 may include updating the set of basis functions that are utilized in the encoder network and/or decoder network.

In some implementations, the method 600 includes determining a channel gradient estimation that represents a difference between the first RF signal and the second RF signal. For example, the channel gradient estimation may be determined using analytic models of at least one of the first transceiver, the second transceiver, the first communication channel, the second communication channels, or the relay channel to estimate alteration of the first RF signal. For example, the channel gradient estimation may be implemented as a transfer function between the first RF signal and the second RF signal. In some cases, known reference signals are used to measure and/or estimate this channel response/gradient.

In some implementations, the updating process 614 includes determining an objective function that includes the channel gradient estimation and the measure of distance between the second information and the first information. In some examples, the objective function may include various other factors including at least one of a measure of reconstruction error, a measure of computational complexity, bandwidth, SNR, bit error, frame error, packet error, latency, power, phase, signal shape or performance metric, or various combinations thereof. The updating process 614 may include calculating a rate of change of the objective function relative to variations in at least one of the encoder machine-learning network of the first transceiver or the decoder machine-learning network of the second transceiver. For example, an optimum set of weights of the encoder network or the decoder network may be determined based on a minimum of the rate of change of the objective function relative to the variations in at least one of the encoder machine-learning network or the decoder machine-learning network. The updating may result in a value of the measure of distance or the objective function below a predetermined threshold.

In some implementations, the method 600 further includes determining, based on the second RF signal and the second information, feedback information that includes at least one of (i) the measure of distance between the second information and the first information, or (ii) performance information that indicates an estimated communication performance of at least one of the encoder machine-learning network or the decoder machine-learning network for communications through the first communication channel, the second communication channel, and the relay communication channel. For example, the performance information may be determined by operations or algorithms for cyclic redundancy check, protocol fields, quality of service (QoS), or checksums, for instance, to estimate performance of the communication system based on the output from the decoder network.

In some examples, the performance information indicates at least one of (i) an SNR or received signal strength (RSS) of the second RF signal, (ii) delay spread caused by time-varying effects of the first communication channel, the second communication channel, and the relay communication channel, (iii) an error rate that indicates a rate of information altered from the first information through the communications relative to the first information, (iv) an oscillator stability of the first transceiver, the second transceiver, the communications satellite, or the ground station, or (v) an RF compression or distortion caused by nonlinearity in amplification or an analog signal processing of the first RF signal or the second RF signal.

In some implementations, the updating process 614 is performed in response to reception of the feedback information including the performance information to update at least one of the encoder machine-learning network of the first transceiver or the decoder machine-learning network of the second transceiver. For example, the updating process 614 may update at least one encoding network weight in one or more layers of the encoder machine-learning network of the first transceiver in response to reception of the feedback information, or at least one decoding network weight in one or more layers of the decoder machine-learning network of the second transceiver in response to reception of the feedback information.

Figure 7:
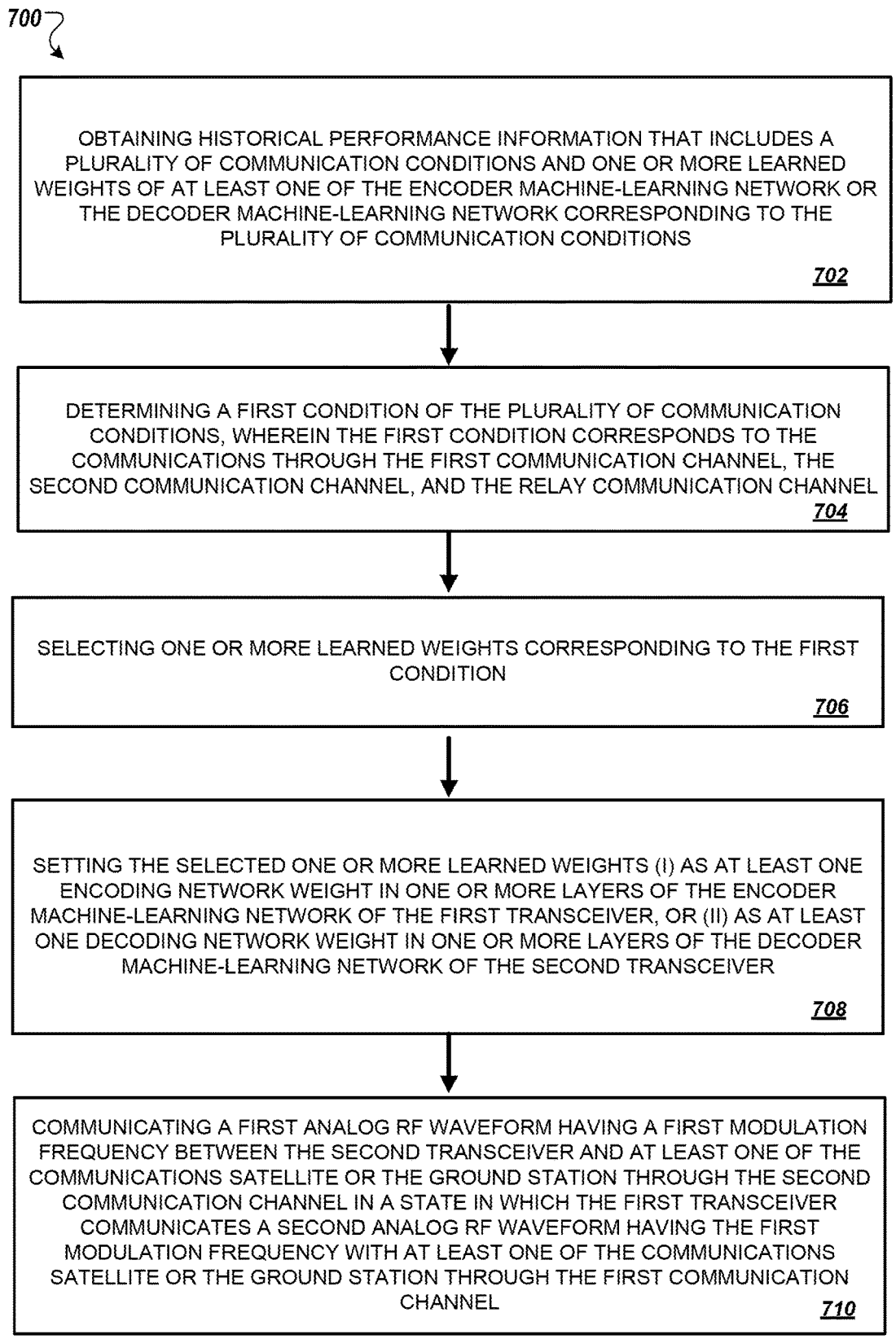
FIG. 7 is a flowchart illustrating an example method of sharing a frequency band with multiple transceivers based on learned machine-learning encoder and decoder networks of the multiple transceivers.

FIG. 7 is a flowchart illustrating an example method of sharing a frequency band with multiple transceivers based on learned machine-learning encoder and decoder networks of the multiple transceivers. In some implementations, a method 700 is used for space communications. For example, the operations described in method 700 are performed by one or more transceivers such as radio transceiver 510, or 520, as described with respect to FIG. 5, for communicating with a satellite in a space communications system such as communications satellite 502. The method 700 includes obtaining historical performance information that includes a plurality of communication conditions and one or more learned weights of at least one of the encoder machine-learning network or the encoder machine-learning network corresponding to the plurality of communication conditions (702). For example, the historical performance information may include estimations for an SNR, delay spread, bit error rate, symbol error distance, oscillator stability, radio compression curve, etc. for various communication conditions. The historical performance information may also include one or more learned weights of the encoder network or decoder network associated with one or more of the various communication conditions. In some cases, one or more operations of the method 700 are performed in addition to the operations of the method 600 described above.

The method 700 further includes determining a first condition of the plurality of communication conditions, where the first condition corresponds to the communications through the first communication channel, the second communication channel, and the relay communication channel (704). For example, the radio controller may determine a communication condition among the plurality of communication conditions by comparing present performance information to the historical performance information. In some examples, the radio controller may include a lookup table or a database that includes a set of optimal weights for each communication condition. For instance, a radio controller of a radio transceiver that includes a decoder network may include a first set of learned weights of an encoder network associated with a high SNR environment, and a second set of learned weights of the encoder network associated with a low SNR environment. The historical performance information may be learned during the training process discussed above with reference to FIG. 5, or obtained from a simulation or other data sources such as another radio transceiver, a communications satellite, or a ground station.

The method 700 further includes selecting one or more learned weights corresponding to the first condition (706). For example, the radio controller may select one or both of a set of learned weights for an encoder network, or a set of weights for a decoder network corresponding to the determined communication condition based on comparison between the present performance information and the historical performance information. The selected weights may correspond to weights of one or more layers of the encoder network or decoder network that enable an objective function such as a reconstruction loss function to achieve a goal value (e.g., a tolerable bit error rate). In some examples, the selected weights may enable an optimal or near optimal capacity (e.g., Shannon capacity) in the first communication condition.

The method 700 further includes setting the selected one or more learned weights as at least one of (i) at least one encoding network weight in one or more layers of the encoder machine-learning network of the first transceiver, or (ii) at least one decoding network weight in one or more layers of the decoder machine-learning network of the second transceiver (708). In some cases, a radio controller of a receiving transceiver may update its decoder network with the selected weights. In some cases, a radio controller of a transmitting transceiver may update its encoder network with selected weights. In other examples, the radio controller of the receiving transceiver may transmit (i.e., feedback) the selected weights, gradients, or intermediate values to the transmitting transceiver so that the radio controller of the transmitting transceiver can update one or more layers of its encoder network with the selected weights from the receiving transceiver. In some examples, the radio controller of the receiving transceiver may transmit the performance information to the transmitting transceiver so that the radio controller of the transmitting transceiver can select encoder weights corresponding to the received performance information to update the encoder network of the transmitting transceiver.

The method 700 further includes communicating a first analog RF waveform having a first modulation frequency between the second transceiver and at least one of the communications satellite or the ground station through the second communication channel in a state in which the first transceiver communicates a second analog RF waveform having the first modulation frequency with at least one of the communications satellite or the ground station through the first communication channel (710). For example, the first, second, or many other transceivers may effectively share access to a limited frequency band of a radio transponder of a communications satellite or ground station using learned modulation/encoding schemes according to their specific channel/hardware impairment conditions.

Orthogonality between two signals may be defined by analytical operations with the two signals such as multiplication, integration, or cross correlation. In some examples, a modulation of the first analog RF waveform is orthogonal to a modulation of the second analog RF waveform to enable simultaneous communication with a communications satellite or ground station. For example, a correlation operation between the modulation of the first analog RF waveform and the modulation of the second analog RF waveform result in a zero value. In other examples, the modulation of the first analog RF waveform is not orthogonal to the modulation of the second analog RF waveform using the using learned modulation/encoding schemes according to their specific channel/hardware impairment conditions. For example, a correlation operation between the modulation of the first analog RF waveform and the modulation of the second analog RF waveform result in a non-zero value.

Figure 8:
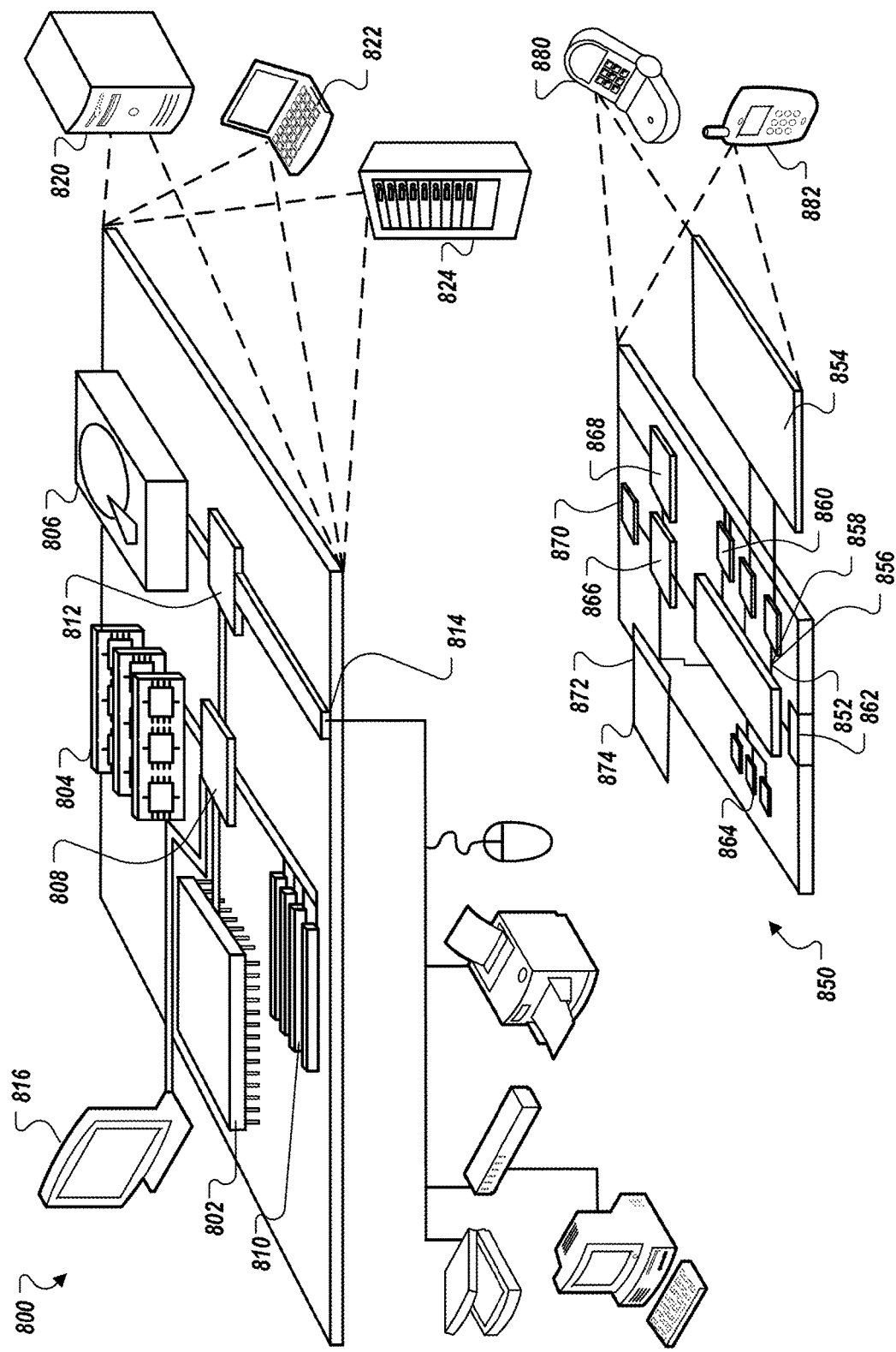
FIG. 8 is a diagram illustrating an example of a computing system used to implement one or more components of a system that performs learned communication over RF channels for space communications systems.

FIG. 8 is a diagram illustrating an example of a computing system used to implement one or more components of a system that performs learned communication over RF channels for space communications systems, in some implementations.

The computing system includes computing device 800 and a mobile computing device 850 that can be used to implement the techniques described herein. For example, one or more parts of an encoder machine-learning network system or a decoder machine-learning network system could be an example of the system described here, such as a computer system implemented in any of the machine-learning networks, devices that access information from the machine-learning networks, or a server that accesses or stores information regarding the encoding and decoding performed by the machine-learning networks.

In some implementations, the computing device 800 corresponds to the radio transceivers 102, 104, or 106 in FIG. 1. In some examples, the radio transceivers 102, 104, or 106 include one or more components of the computing device 800, for example, such as a processor 802 or a memory 804. In some implementations, the mobile device 850 corresponds to the radio transceivers 102, 104, or 106 in FIG. 1. In some examples, the radio transceivers 102, 104, or 106 include one or more components of the mobile device 850, for example, such as a processor 852 or a memory 864.

The computing device 800 is intended to represent various forms of digital computers, such as laptops, desktops, workstations, personal digital assistants, servers, blade servers, mainframes, and other appropriate computers. The mobile computing device 850 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 802 is a single-threaded processor. In some implementations, the processor 802 is a multi-threaded processor. In some implementations, the processor 802 is a quantum computer.

The memory 804 stores information within the computing device 800. In some implementations, the memory 804 is a volatile memory unit or units. In some implementations, the memory 804 is a non-volatile memory unit or units. The memory 804 may also be another form of computer-readable medium, such as a magnetic or optical disk.

The storage device 806 is capable of providing mass storage for the computing device 800. In some implementations, the storage device 806 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 802), perform one or more methods, such as those described above. The instructions can also be stored by one or more storage devices such as computer- or machine-readable mediums (for example, the memory 804, the storage device 806, or memory on the processor 802). The high-speed interface 808 manages bandwidth-intensive operations for the computing device 800, while the low-speed interface 812 manages lower bandwidth-intensive operations. Such allocation of functions is an example only. In some implementations, the high-speed interface 808 is coupled to the memory 804, the display 816 (e.g., through a graphics processor or accelerator), and to the high-speed expansion ports 810, which may accept various expansion cards (not shown). In the implementation, the low-speed interface 812 is coupled to the storage device 806 and the low-speed expansion port 814. The low-speed expansion port 814, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. In addition, it may be implemented in a personal computer such as a laptop computer 822. It may also be implemented as part of a rack server system 824. Alternatively, components from the computing device 800 may be combined with other components in a mobile device (not shown), such as a mobile computing device 850. Each of such devices may include one or more of the computing device 800 and the mobile computing device 850, and an entire system may be made up of multiple computing devices communicating with each other.

The mobile computing device 850 includes a processor 852, a memory 864, and an input/output device such as a display 854, a communication interface 866, and a transceiver 868, among other components. The mobile computing device 850 may also be provided with a storage device, such as a micro-drive or other device, to provide additional storage. Each of the processor 852, the memory 864, the display 854, the communication interface 866, and the transceiver 868, are interconnected using various buses, and several of the components may be mounted on a common motherboard or in other manners as appropriate.

The processor 852 can execute instructions within the mobile computing device 850, including instructions stored in the memory 864. The processor 852 may be implemented as a chipset of chips that include separate and multiple analog and digital processors. The processor 852 may provide, for example, for coordination of the other components of the mobile computing device 850, such as control of user interfaces, applications run by the mobile computing device 850, and wireless communication by the mobile computing device 850.

The processor 852 may communicate with a user through a control interface 858 and a display interface 856 coupled to the display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may provide communication with the processor 852, so as to enable near area communication of the mobile computing device 850 with other devices. The external interface 862 may provide, for example, for wired communication in some implementations, or for wireless communication in other implementations, and multiple interfaces may also be used.

The memory 864 stores information within the mobile computing device 850. The memory 864 can be implemented as one or more of a computer-readable medium or media, a volatile memory unit or units, or a non-volatile memory unit or units. An expansion memory 874 may also be provided and connected to the mobile computing device 850 through an expansion interface 872, which may include, for example, a SIMM (Single in Line Memory Module) card interface. The expansion memory 874 may provide extra storage space for the mobile computing device 850, or may also store applications or other information for the mobile computing device 850. Specifically, the expansion memory 874 may include instructions to carry out or supplement the processes described above, and may include secure information also. Thus, for example, the expansion memory 874 may be provide as a security module for the mobile computing device 850, and may be programmed with instructions that permit secure use of the mobile computing device 850. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier such that the instructions, when executed by one or more processing devices (for example, processor 852), perform one or more methods, such as those described above. The instructions can also be stored by one or more storage devices, such as one or more computer- or machine-readable mediums (for example, the memory 864, the expansion memory 874, or memory on the processor 852). In some implementations, the instructions can be received in a propagated signal, for example, over the transceiver 868 or the external interface 862.

The mobile computing device 850 may communicate wirelessly through the communication interface 866, which may include digital signal processing circuitry where useful. The communication interface 866 may provide for communications under various modes or protocols, such as GSM voice calls (Global System for Mobile communications), SMS (Short Message Service), EMS (Enhanced Messaging Service), or MIMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G ($5^{th}$ Generation/$6^{th}$ Generation) cellular, among others. Such communication may occur, for example, through the transceiver 868 using a radio frequency. In addition, short-range communication may occur, such as using a Bluetooth, Wi-Fi, or other such transceiver (not shown). In addition, a GPS (Global Positioning System) receiver module 870 may provide additional navigation- and location-related wireless data to the mobile computing device 850, which may be used as appropriate by applications running on the mobile computing device 850.

The mobile computing device 850 may also communicate audibly using an audio codec 860, which may receive spoken information from a user and convert it to usable digital information. The audio codec 860 may likewise generate audible sound for a user, such as through a speaker, e.g., in a handset of the mobile computing device 850. Such sound may include sound from voice telephone calls, may include recorded sound (e.g., voice messages, music files, etc.) and may also include sound generated by applications operating on the mobile computing device 850.

The mobile computing device 850 may be implemented in a number of different forms, as shown in the figure. For example, it may be implemented as a cellular telephone 880. It may also be implemented as part of a smart-phone 882, personal digital assistant, or other similar mobile device.

The term "system" as used in this disclosure may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server is a general-purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

What is claimed is:

1. A method performed by one or more processors configured to train one or more machine-learning networks to process information transmitted through one or more communication channels, the method comprising:
   determining first information for transmission from a first transceiver;
   generating a first radio frequency (RF) signal by processing the first information using an encoder machine-learning network of the first transceiver;
   transmitting the first RF signal from the first transceiver through a first communication channel;
   receiving a second RF signal at a second transceiver through a second communication channel that is different from the first communication channel, wherein the second RF signal represents the first RF signal having been altered by at least one of transmission through the first communication channel or the second communication channel;
   generating second information as a reconstruction of the first information by processing the second RF signal using a decoder machine-learning network of the second transceiver;
   comparing the first information and the second information; and
   updating at least one of the encoder machine-learning network or the decoder machine-learning network based on the comparison of the first information and the second information.

2. The method of claim 1, wherein transmitting the first RF signal comprises transmitting the first RF signal from the first transceiver to at least one of a communications satellite or a ground station through the first communication channel, and
   wherein receiving the second RF signal comprises receiving the second RF signal from at least one of the communications satellite or the ground station through the second communication channel.

3. The method of claim 2, wherein receiving the second RF signal comprises receiving the second RF signal at a plurality of second transceivers from at least one of the communications satellite or the ground station, the second RF signal received at each of the plurality of second transceivers varying based on at least one of transmission through the first communication channel, or the second communication channel.

4. The method of claim 2, further comprising:
   determining, based on the second RF signal and the second information, feedback information that includes at least one of (i) a difference between the second information and the first information, or (ii) performance information that indicates an estimated communication performance of at least one of the encoder machine-learning network or the decoder machine-learning network for transmission through the first communication channel and the second communication channel,
   wherein updating at least one of the encoder machine-learning network or the decoder machine-learning network comprises updating, in response to reception of the feedback information, at least one of the encoder machine-learning network or the decoder machine-learning network.

5. The method of claim 4, wherein the performance information includes at least one of (i) a signal to noise ratio (SNR) or received signal strength (RSS) of the second RF signal, (ii) delay spread caused by time-varying effects of at least one of the first communication channel or the second communication channel, (iii) an error rate that indicates a rate of information altered from the first information through the transmissions, (iv) an oscillator stability of at least one of the first transceiver, the second transceiver, the communications satellite, or the ground station, or (v) an RF compression or distortion caused by nonlinearity in amplification or an analog signal processing of the first RF signal or the second RF signal.

6. The method of claim 4, wherein updating, in response to reception of the feedback information, at least one of the encoder machine-learning network or the decoder machine-learning network comprises at least one of:
   updating at least one encoding network weight in one or more layers of the encoder machine-learning network in response to reception of the feedback information; or
   updating at least one decoding network weight in one or more layers of the decoder machine-learning network in response to reception of the feedback information.

7. The method of claim 4, further comprising:
   obtaining historical performance information that includes a plurality of communication conditions and one or more learned weights of at least one of the encoder machine-learning network or the decoder machine-learning network corresponding to the plurality of communication conditions;
   determining a first condition of the plurality of communication conditions, wherein the first condition corresponds to the communications through the first communication channel and the second communication channel; and
   selecting one or more learned weights corresponding to the first condition,
   wherein updating at least one of the encoder machine-learning network or the decoder machine-learning network comprises at least one of:
   setting the selected one or more learned weights as at least one encoding network weight in one or more layers of the encoder machine-learning network of the first transceiver; or
   setting the selected one or more learned weights as at least one decoding network weight in one or more layers of the decoder machine-learning network of the second transceiver.

8. The method of claim 4, further comprising:
   communicating a first analog RF waveform having a first modulation frequency between the second transceiver and at least one of the communications satellite or the ground station through the second communication channel in a state in which the first transceiver communicates a second analog RF waveform having the first modulation frequency with at least one of the communications satellite or the ground station through the first communication channel.

9. The method of claim 8, wherein a modulation of the first analog RF waveform is orthogonal to a modulation of the second analog RF waveform, wherein a correlation operation of the modulation of the first analog RF waveform and the modulation of the second analog RF waveform results in a zero value.

10. The method of claim 8, wherein a modulation of the first analog RF waveform is not orthogonal to a modulation of the second analog RF waveform, wherein a correlation operation of the modulation of the first analog RF waveform and the modulation of the second analog RF waveform results in a non-zero value.

11. The method of claim 4, further comprising:
   transmitting the feedback information from the second transceiver to the first transceiver through a third communication channel that is different from the first and second communication channels.

12. The method of claim 11, wherein the third communication channel comprises at least one of a radio communication channel, an acoustic communication channel, an optical communication channel, or a wired communication channel between the second transceiver and the first transceiver.

13. The method of claim 1, wherein comparing the first information and the second information comprises calculating a measure of distance that represents a difference between the second information and the first information, and
   wherein updating at least one of the encoder machine-learning network or the decoder machine-learning network comprises:
   changing one or more parameters of the encoder machine-learning network or the decoder machine-learning network to decrease the measure of distance below a predetermined threshold.

14. The method of claim 13, further comprising:
   determining a channel gradient estimation that represents a difference between the first RF signal and the second RF signal,
   wherein updating at least one of the encoder machine-learning network of the first transceiver or the decoder machine-learning network of the second transceiver comprises:
   determining an objective function comprising the measure of distance and the channel gradient estimation,
   calculating a rate of change of the objective function relative to variations in at least one of the encoder machine-learning network of the first transceiver or the decoder machine-learning network of the second transceiver, and
   determining a goal value of the objective function by using the rate of change of the objective function relative to the variations in at least one of the encoder machine-learning network or the decoder machine-learning network, wherein the goal value corresponds to a value that is within a predetermined range from a minimum of the objective function.

15. The method of claim 2, further comprising:
   processing the first RF signal to generate a first analog RF waveform; and
   using one or more transmit antennas of the first transceiver to transmit the first analog RF waveform through the first communication channel,
   wherein processing the first RF signal to generate the first analog RF waveform comprises at least one of:
   amplifying power of the first RF signal to transmit to at least one of the communications satellite or the ground station,
   converting a frequency of the first RF signal corresponding to a reception frequency band of at least one of the communications satellite or the ground station, or filtering a noise signal from the first RF signal.

16. The method of claim 15, further comprising:
   receiving a second analog RF waveform through the second communication channel using one or more receive antennas of the second transceiver, wherein the second analog RF waveform represents the first analog RF waveform having been altered by at least one of the first communication channel or the second communication channel; and processing the second analog RF waveform to generate the second RF signal, wherein processing the second analog RF waveform comprises at least one of:

amplifying power of the second analog RF waveform to process through an analog to digital converter (ADC) of the second transceiver, converting a frequency of the second analog RF waveform corresponding to a frequency band of the ADC of the second transceiver, transforming the second analog RF waveform to digital form using the ADC, or filtering a noise signal from the second analog RF waveform before processing through the ADC.

17. The method of claim 1, wherein the first communication channel comprises at least one of a radio communication channel, an acoustic communication channel, or an optical communication channel, and wherein the second communication channel comprises at least one of a radio communication channel, an acoustic communication channel, or an optical communication channel.

18. A method performed by one or more processors configured to use one or more machine-learning networks to process information transmitted through one or more communication channels, the method comprising:

determining first information for transmission from a first transceiver;

generating a first radio frequency (RF) signal by processing the first information using an encoder machine-learning network that has been trained and included in the first transceiver;

transmitting the first RF signal from the first transceiver through a first communication channel;

receiving a second RF signal at a second transceiver through a second communication channel that is different from the first communication channel, wherein the second RF signal represents the first RF signal having been altered by transmission through the first communication channel or the second communication channel; and generating second information as a reconstruction of the first information by processing the second RF signal using a decoder machine-learning network that has been trained and included in the second transceiver.

19. The method of claim 18, wherein transmitting the first RF signal comprises transmitting the first RF signal to at least one of a communications satellite or a ground station through the first communication channel, and wherein receiving the second RF signal comprises receiving the second RF signal at a plurality of second transceivers from at least one of the communications satellite, the ground station, or the first transceiver.

20. The method of claim 18, further comprising:

comparing the first information and the second information; and updating at least one of the encoder machine-learning network or the decoder machine-learning network based on the comparison of the first information and the second information.

21. A non-transitory computer-readable storage medium having stored thereon instructions which, when executed by at least one processor, cause performance of operations comprising:

determining first information for transmission from a first transceiver;

generating a first radio frequency (RF) signal by processing the first information using an encoder machine-learning network that has been trained and included in the first transceiver;

transmitting the first RF signal from the first transceiver through a first communication channel;

receiving a second RF signal at a second transceiver through a second communication channel that is different from the first communication channel, wherein the second RF signal represents the first RF signal having been altered by transmission through the first communication channel or the second communication channel; and generating second information as a reconstruction of the first information by processing the second RF signal using a decoder machine-learning network that has been trained and included in the second transceiver.

22. The storage medium of claim 21, wherein transmitting the first RF signal comprises transmitting the first RF signal to at least one of a communications satellite or a ground station through the first communication channel, and wherein receiving the second RF signal comprises receiving the second RF signal at a plurality of second transceivers from at least one of the communications satellite, the ground station, or the first transceiver.

23. The storage medium of claim 21, wherein the operations further comprise:

comparing the first information and the second information; and updating at least one of the encoder machine-learning network or the decoder machine-learning network based on the comparison of the first information and the second information.

* * * * *